(12) United States Patent
Chern

(10) Patent No.: US 12,405,422 B2
(45) Date of Patent: Sep. 2, 2025

(54) CLADDING STRUCTURE FOR SEMICONDUCTOR WAVEGUIDE

(71) Applicant: Taiwan Semiconductor Manufacturing Company, Ltd., Hsinchu (TW)

(72) Inventor: Chan-Hong Chern, Palo Alto, CA (US)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 237 days.

(21) Appl. No.: 17/895,342

(22) Filed: Aug. 25, 2022

(65) Prior Publication Data

US 2024/0069278 A1 Feb. 29, 2024

(51) Int. Cl.
*G02B 6/122* (2006.01)
*G02B 6/12* (2006.01)
(Continued)

(52) U.S. Cl.
CPC ......... *G02B 6/1223* (2013.01); *G02B 6/1228* (2013.01); *G02B 6/132* (2013.01); *G02B 6/136* (2013.01); *G02B 2006/12195* (2013.01)

(58) Field of Classification Search
CPC ........ G02B 2006/12176; G02B 6/1228; G02B 6/1223; G02B 6/132; G02B 6/136; G02B 2006/12195
See application file for complete search history.

(56) References Cited

U.S. PATENT DOCUMENTS

| 2004/0037497 | A1* | 2/2004 | Lee | ............... G02B 6/132 |
| | | | | 385/28 |
| 2007/0274654 | A1 | 11/2007 | Choudhury et al. | |

(Continued)

FOREIGN PATENT DOCUMENTS

| TW | 201130117 A | 9/2011 |
| WO | 2021178727 A1 | 9/2021 |

OTHER PUBLICATIONS

Tsuchizawa et al. "Spot-Size Converters for Rib-Type Silicon Photonic Wire Waveguides" 2008 5th IEEE International Conference on Group IV Photonics, published on Oct. 7, 2008.

*Primary Examiner* — Thomas A Hollweg
*Assistant Examiner* — Kirsten D. Endresen
(74) *Attorney, Agent, or Firm* — Eschweiler & Potashnik, LLC

(57) ABSTRACT

A semiconductor structure including a semiconductor waveguide layer over a second dielectric layer and between sidewalls of a first dielectric layer. A first cladding layer is between the sidewalls of the first dielectric layer and directly over the semiconductor waveguide layer. A second cladding layer is between sidewalls of the second dielectric layer and directly under the semiconductor waveguide layer. A difference between a refractive index of the semiconductor waveguide layer and a refractive index of the first cladding layer is less than a difference between the refractive index of the semiconductor waveguide layer and a refractive index of the first dielectric layer. A difference between the refractive index of the semiconductor waveguide layer and a refractive index of the second cladding layer is less than a difference between the refractive index of the semiconductor waveguide layer and a refractive index of the second dielectric layer.

20 Claims, 33 Drawing Sheets

(51) Int. Cl.
*G02B 6/132* (2006.01)
*G02B 6/136* (2006.01)

(56) References Cited

U.S. PATENT DOCUMENTS

| | | |
|---|---|---|
| 2010/0086255 A1 | 4/2010 | Ishizaka |
| 2018/0074259 A1* | 3/2018 | Hickey ................ G02B 6/1221 |
| 2022/0057577 A1 | 2/2022 | Chern et al. |
| 2023/0244034 A1* | 8/2023 | Malik .................. G02B 6/1228 |
| | | 385/14 |

* cited by examiner

CLADDING STRUCTURE FOR SEMICONDUCTOR WAVEGUIDE

BACKGROUND

Optical waveguides are often used as components in integrated optical circuits. Optical waveguides are used to confine and guide light from a first point on an integrated chip (IC) to a second point on the IC with minimal attenuation. Many modern optical waveguides are formed using semiconductors. A semiconductor waveguide may include an optical converter or an optical coupler for optically coupling an optical fiber to the semiconductor waveguide.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 11A-32A illustrate cross-sectional views and FIGS. 11B-32B illustrate corresponding three-dimensional views of some embodiments of a method for forming a semiconductor structure comprising a semiconductor waveguide layer, a first cladding layer along a first side of the semiconductor waveguide layer, and a second cladding layer along a second side of the semiconductor waveguide layer.

DETAILED DESCRIPTION

Figure 1A:
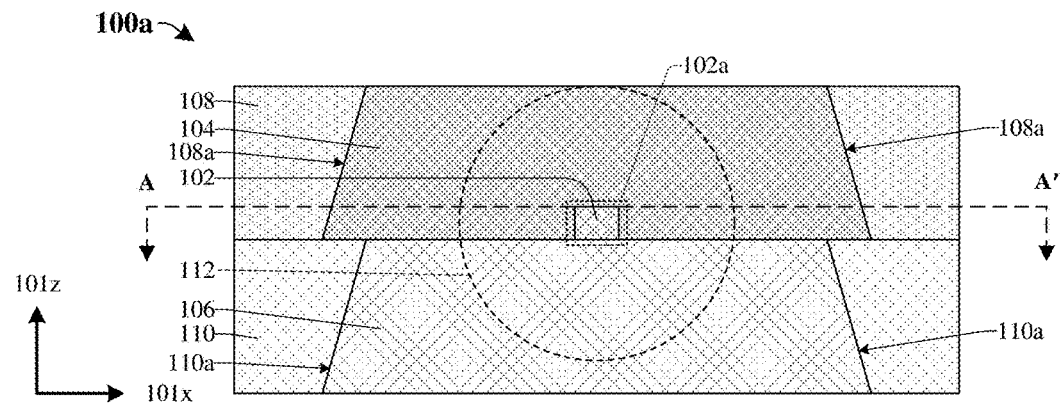
FIG. 1A and FIG. 1B illustrate cross-sectional views of some embodiments of a semiconductor structure comprising a semiconductor waveguide layer, a first cladding layer over the semiconductor waveguide layer, and a second cladding layer under the semiconductor waveguide layer.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Some modern integrated chips include optical structures. For example, an integrated chip includes an optical waveguide layer for guiding optical radiation. The optical waveguide layer comprises a semiconductor material and is disposed over a buried dielectric layer of a semiconductor-on-insulator (SOI) substrate. An optical fiber may be coupled to the optical waveguide layer. A mode size (e.g., the size of the electric field distribution) in the optical fiber is substantially greater than a mode size in the optical waveguide layer. Thus, the optical waveguide layer may include a spot-size converter (SSC) for expanding the mode size along the optical waveguide layer to match the mode size of the optical fiber. The SSC is formed by a tapered segment of the optical waveguide layer which tapers to a waveguide tip. The mode size in the optical waveguide layer expands along the taper as the taper approaches the tip. Ideally, the mode size expansion at the tip is large enough that the mode size of the optical waveguide layer at the tip matches the mode size of the optical fiber.

In some devices, the expansion of the mode size at the tip depends, in part, on the size of the optical waveguide layer at the tip. For example, as the dimensions (e.g., the width and/or the thickness) of the waveguide tip are reduced, and the expansion of the mode size at the tip is increased. Thus, to achieve substantially large mode size expansion at the waveguide tip so that the mode size at the waveguide tip matches the mode size of the optical fiber, the taper must narrow to a substantially small tip.

However, forming a taper having a tip with such small dimensions can be challenging. For example, because the waveguide tip is formed to have such small dimensions, even minor variations in the fabrication process can result in relatively substantial variations in size of the waveguide tip which can cause substantial variations in the mode size expansion at the waveguide tip. Substantial variations in the mode size expansion at the waveguide tip can cause substantial variations in a coupling efficiency between the optical waveguide layer and the optical fiber. As a result, a performance of the optical waveguide layer may be reduced.

Various embodiments of the present disclosure are related to a semiconductor structure comprising a semiconductor waveguide layer which tapers to a tip, where the tip is surrounded by a first cladding layer and a second cladding layer to improve a performance of the semiconductor structure. For example, the first cladding layer is disposed directly over the tip of the semiconductor waveguide layer and on opposite sides of the semiconductor waveguide layer. The second cladding layer is disposed directly under the tip of the semiconductor waveguide layer. An optical fiber can be optically coupled to the semiconductor waveguide layer at the tip. The first cladding layer and the second cladding layer have refractive indices that are substantially similar to the refractive index of the semiconductor waveguide layer.

The expansion of the mode size of the semiconductor waveguide layer at the tip of the semiconductor waveguide layer is affected by both the size of the tip and the materials surrounding the tip. For example, as the difference between the refractive index of the semiconductor waveguide layer and the refractive index of the surrounding layers is reduced, the expansion of the mode size at the tip is increased. Thus, by surrounding the tip of the semiconductor waveguide layer with the first and second cladding layers having refractive indices that are substantially similar to the refractive index of the semiconductor waveguide layer, the dimensional requirements of the tip can be relaxed (e.g., the size of the tip can be increased) without reducing a mode field expansion at the tip. By relaxing the dimensional requirements of the tip, variations in the fabrication of the tip may have a reduced impact on the resulting size of the waveguide tip. Thus, a relative precision and/or accuracy of the tip may be improved. As a result, a coupling efficiency between the semiconductor waveguide layer and the optical fiber may be improved.

FIG. 1A illustrates a cross-sectional view 100a of some embodiments of a semiconductor structure comprising a semiconductor waveguide layer 102, a first cladding layer 104 over the semiconductor waveguide layer 102, and a second cladding layer 106 under the semiconductor waveguide layer 102. In some embodiments, the cross-sectional view 100a of FIG. 1A is illustrated in an x-z plane formed by x-axis 101x and z-axis 101z. In some embodiments, the cross-sectional view 100a of FIG. 1A may, for example, be taken across line A-A' of FIG. 1C.

The semiconductor structure includes a first dielectric layer 108. The first dielectric layer 108 comprises a first dielectric having a first refractive index. A second dielectric layer 110 is under the first dielectric layer 108. The second dielectric layer 110 comprises a second dielectric having a second refractive index. The semiconductor waveguide layer 102 is over the second dielectric layer 110. The semiconductor waveguide layer 102 tapers to a tip 102a (e.g., as shown in FIGS. 1C, 1D). The tip 102a of the semiconductor waveguide layer 102 is directly between first sidewalls 108a of the first dielectric layer 108. The semiconductor waveguide layer 102 comprises a semiconductor having a third refractive index.

In some embodiments, an optical fiber 112 is arranged adjacent to the tip 102a and is optically coupled to the semiconductor waveguide layer 102 at the tip 102a. A size of the optical fiber 112 (e.g., a diameter of a core of the optical fiber 112) is substantially larger than the size (e.g., a height and/or a width) of the semiconductor waveguide layer 102. Thus, a mode of the optical fiber 112 is substantially larger than a mode of the semiconductor waveguide layer 102. Consequently, a substantially large mode size expansion must occur at the tip 102a to match the mode size at the tip 102a to the mode size of the optical fiber 112.

The first cladding layer 104 and the second cladding layer 106 surround the tip 102a of the semiconductor waveguide layer 102. For example, the first cladding layer 104 is directly between the first sidewalls 108a of the first dielectric layer 108, on opposite sides of the tip 102a, and directly over the tip 102a. The second cladding layer 106 is directly between first sidewalls 110a of the second dielectric layer 110 and directly under the tip 102a. The first cladding layer 104 comprises a third dielectric having a fourth refractive index. The second cladding layer 106 comprises a fourth dielectric having a fifth refractive index. The third dielectric and the fourth dielectric are different than the first dielectric and the second dielectric.

A difference between the third refractive index and the fourth refractive index is less than a difference between the third refractive index and the first refractive index. Further, a difference between the third refractive index and the fifth refractive index is less than a difference between the third refractive index and the second refractive index. Furthermore, the fourth refractive index and the fifth refractive index are substantially similar to the third refractive index. For example, in some embodiments, both a difference between the refractive index of the semiconductor waveguide layer 102 (e.g., the third refractive index) and the refractive index of the first cladding layer 104 (e.g., the fourth refractive index) and a difference between the refractive index of the semiconductor waveguide layer 102 (e.g., the third refractive index) and the refractive index of the second cladding layer 106 (e.g., the fifth refractive index) are less than 2, less than 1.8, less than 1.6, or some other suitable value.

By surrounding the tip 102a of the semiconductor waveguide layer 102 with the first and second cladding layers 104, 106 having refractive indices that are substantially similar to the refractive index of the semiconductor waveguide layer 102, the dimensional requirements of the tip 102a can be relaxed (e.g., the size of the tip 102a can be increased) without reducing a mode field expansion at the tip 102a. By relaxing the dimensional requirements of the tip 102a, variations in the fabrication of the tip 102a may have a reduced impact on the resulting size of the tip 102a. Thus, a relative precision and/or accuracy of the size of the tip 102a may be improved. As a result, a coupling efficiency between the semiconductor waveguide layer 102 and the optical fiber 112 may be improved.

Figure 1B:
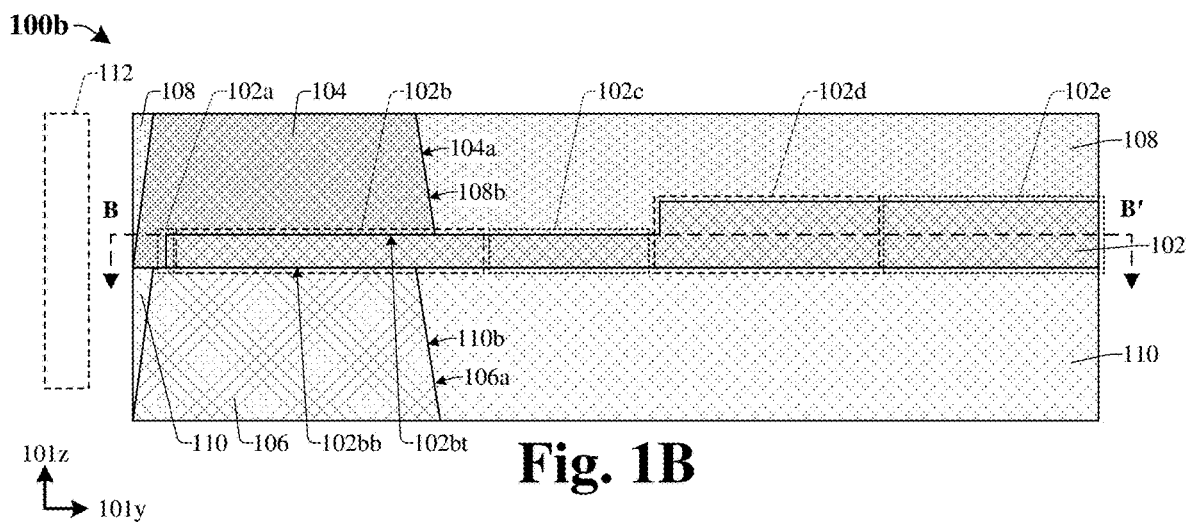
Figure 1C:
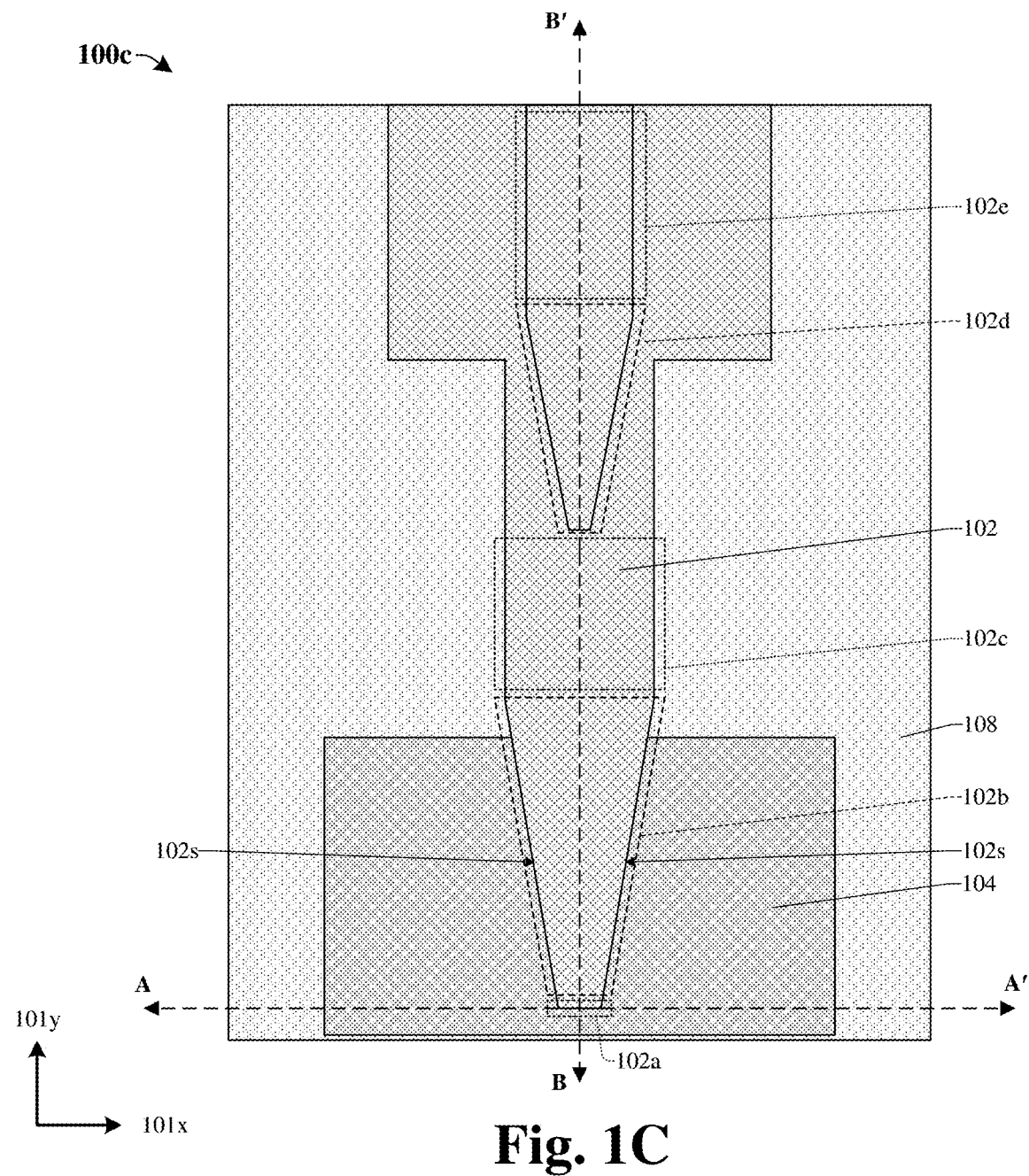
FIG. 1C illustrates a top view of some embodiments of the semiconductor structure of FIG. 1A and FIG. 1B.
Figure 1D:
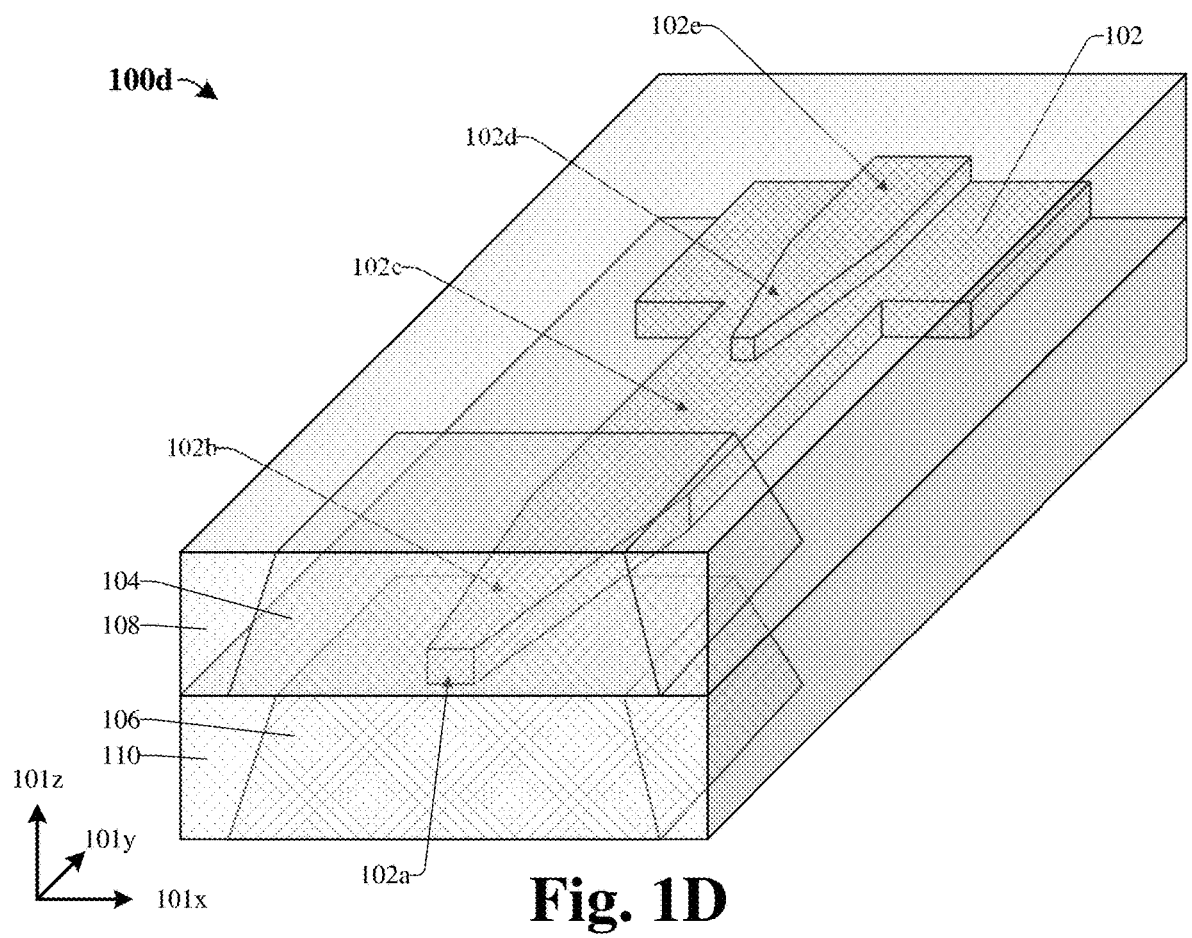
FIG. 1D illustrates a three-dimensional view of some embodiments of the semiconductor structure of FIGS. 1A-1C.

FIG. 1B illustrates another cross-sectional view 100b of some embodiments of the semiconductor structure of FIG. 1A. In some embodiments, the cross-sectional view 100b of FIG. 1B is illustrated in an y-z plane formed by y-axis 101y and z-axis 101z. In some embodiments, the cross-sectional view 100b of FIG. 1B may, for example, be taken across line B-B' of FIG. 1C.

The semiconductor waveguide layer 102 comprises a tapered transition segment 102b, a slab transition segment 102c, a tapered device segment 102d, and a slab device segment 102e. The tapered transition segment 102b is between the slab transition segment 102c and the tip 102a. The slab transition segment 102c is between the tapered transition segment 102b and the tapered device segment 102d. The tapered device segment 102d is between the slab transition segment 102c and the slab device segment 102e.

The first cladding layer 104 is directly over the tip 102a and at least part of the tapered transition segment 102b. In some embodiments, the first dielectric layer 108 is directly over part of the tapered transition segment 102b. For example, in some embodiments, the first cladding layer 104 is on an top surface 102bt of the tapered transition segment 102b and the first dielectric layer 108 is on the top surface 102bt of the tapered transition segment 102b.

The second cladding layer 106 is directly under the tip 102a and at least part of the tapered transition segment 102b. In some embodiments, the second dielectric layer 110 is directly under part of the tapered transition segment 102b. For example, in some embodiments, the second cladding layer 106 is on a bottom surface 102bb of the tapered transition segment 102b and the second dielectric layer 110 is on the bottom surface 102bb of the tapered transition segment 102b.

A sidewall 104a of the first cladding layer 104 is directly over the semiconductor waveguide layer 102 (e.g., directly over the tapered transition segment 102b) and a sidewall 106a of the second cladding layer 106 is directly under the semiconductor waveguide layer (e.g., directly under the tapered transition segment 102b). A second sidewall 108b of the first dielectric layer 108 extends along the sidewall 104a of the first cladding layer 104 and is directly over the semiconductor waveguide layer 102 (e.g., directly over the tapered transition segment 102b). A second sidewall 110b of the second dielectric layer 110 extends along the sidewall 106a of the second cladding layer 106 and is directly under the semiconductor waveguide layer 102 (e.g., directly under the tapered transition segment 102b).

The first cladding layer 104 and the second cladding layer 106 surround the tip 102a and the tapered transition segment 102b to increase the mode size expansion at the tip 102a where the semiconductor waveguide layer 102 is optically coupled to the optical fiber 112. The first cladding layer 104 and the second cladding layer 106 do not surround the slab transition segment 102c, the tapered device segment 102d, and the slab device segment 102e to reduce mode size expansion at these segments. Thus, a likelihood of optical radiation escaping the semiconductor waveguide layer 102 and the surrounding first and second dielectric layers 108, 110 along these segments is reduced. As a result, a loss of optical radiation along the semiconductor waveguide layer 102 may be reduced and hence a performance of the semiconductor waveguide layer 102 may be improved.

FIG. 1C illustrates a top view 100c of some embodiments of the semiconductor structure of FIG. 1A and FIG. 1B. In some embodiments, the top view 100c of FIG. 1C is illustrated in an x-y plane formed by x-axis 101x and y-axis 101y. In some embodiments, the top view 100c of FIG. 1C may, for example, be taken across line A-A' of FIG. 1A and/or line B-B' of FIG. 1B.

The first cladding layer 104 is on first sidewalls 102s of the semiconductor waveguide layer 102 and the first dielectric layer 108 is on the first sidewalls 102s of the semiconductor waveguide layer 102. The first dielectric layer 108 is on opposite sides of the slab transition segment 102c, the tapered device segment 102d, and the slab device segment 102e.

A width (e.g., as measured along the x-axis 101x) of the tapered transition segment 102b is tapered along a length (e.g., as measured along the y-axis 101y) of the tapered transition segment to the tip 102a. A width of the slab transition segment 102c is approximately uniform along its length. A width of the tapered device segment 102d is tapered to a tip of the tapered device segment 102d. A width of the slab device segment 102e is approximately uniform along its length. In some embodiments, a lower portion of the semiconductor waveguide layer 102 is wider than an upper portion of semiconductor waveguide layer 102 along the slab device segment 102e.

FIG. 1D illustrates a three-dimensional view 100d of some embodiments of the semiconductor structure of FIGS. 1A-1C.

The tip 102a and part of the tapered transition segment 102b are surrounded by the first cladding layer 104 and the second cladding layer 106. Other segments of the semiconductor waveguide layer 102 are surrounded by the first dielectric layer 108 and the second dielectric layer 110.

In some embodiments, the semiconductor waveguide layer 102 comprises silicon or some other suitable material. In some embodiments, a width (e.g., as measured along the x-axis 101x) of the tip 102a ranges from about 150 nanometers to 200 nanometers, 160 nanometers to 190 nanometers, or some other suitable range. In some embodiments, a thickness (e.g., as measured along the z-axis 101z) of the tip 102a ranges from about 150 nanometers to 250 nanometers, 175 nanometers to 225 nanometers, or some other suitable range. In some embodiments, a width of the slab transition segment 102c ranges from about 600 nanometers to 1000 nanometers or some other suitable value and a thickness of the slab transition segment 102c is approximately equal to the thickness of the tip 102a. In some embodiments, a width of the slab device segment 102e ranges from about 370 nanometers to 470 nanometers or some other suitable value and a thickness of the slab device segment 102e ranges from about 250 nanometers to 350 nanometers or some other suitable range.

In some embodiments, the first dielectric (e.g., of the first dielectric layer 108) and/or the second dielectric (e.g., of the second dielectric layer 110) comprise silicon dioxide or some other suitable material. In some embodiments, a thickness of the first dielectric layer 108 and/or the second dielectric layer 110 ranges from about 2 micrometers to 5 micrometers, 3 micrometers to 5 micrometers, or some other suitable range.

The third dielectric (e.g., of the first cladding layer 104) and/or the fourth dielectric (e.g., of the second cladding layer 106) comprise some dielectric material(s) having a refractive index that is substantially similar to the refractive index of the semiconductor waveguide layer 102. For example, in some embodiments, the third dielectric and/or the fourth dielectric may be or comprise silicon nitride, hafnium oxide, or some other suitable material. In some embodiments, the fourth dielectric is different than the third dielectric and the fifth refractive index (e.g., of the second cladding layer 106) is different from the fourth refractive index (e.g., of the first cladding layer 104). In some other embodiments, the fourth dielectric is the same as the third dielectric and thus the fifth refractive index is the same as the fourth refractive index. In some embodiments, a thickness of the first cladding layer 104 ranges from about 2 micrometers to 5 micrometers, 3 micrometers to 5 micrometers, or some other suitable range. In some embodiments, a thickness of the second cladding layer 106 is approximately equal to the thickness of the first cladding layer 104.

Figure 2:
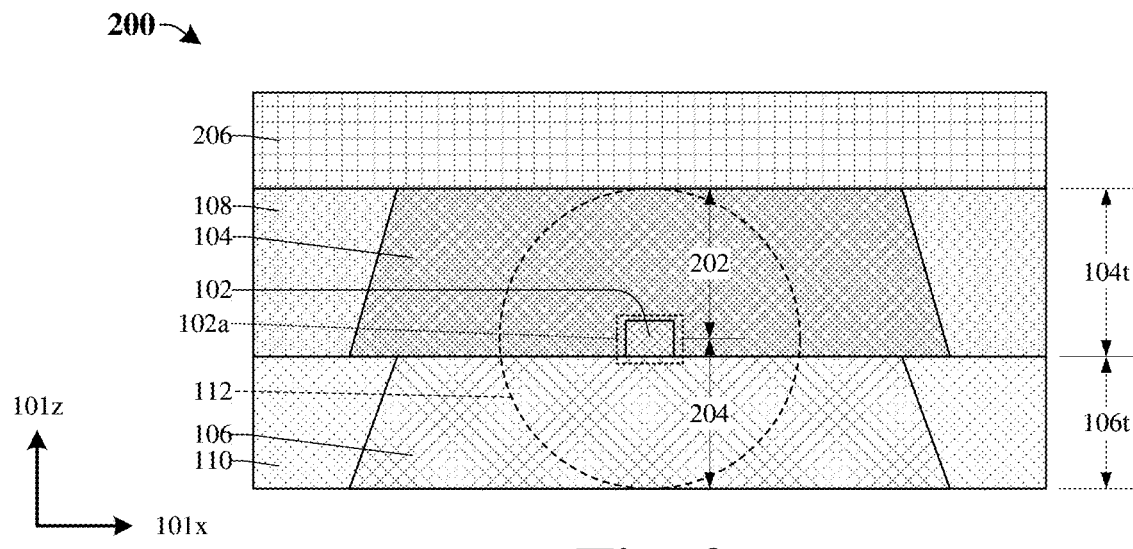
FIG. 2 illustrates a cross-sectional view of some embodiments of the semiconductor structure of FIG. 1A in which a thickness of the second cladding layer is different than the thickness of the first cladding layer.

FIG. 2 illustrates a cross-sectional view 200 of some embodiments of the semiconductor structure of FIG. 1A in which a thickness 106t of the second cladding layer 106 is different than the thickness 104t of the first cladding layer 104.

In some embodiments, the thickness 106t of the second cladding layer 106 is less than the thickness 104t of the first cladding layer 104. For example, because the first cladding layer 104 is over and on opposite sides of the tip 102a of the semiconductor waveguide layer 102, a distance 202 between a top surface of the first cladding layer 104 and a center of the tip 102a is less than the thickness 104t of the first cladding layer 104. Further, because the tip 102a is over the second cladding layer 106, a distance 204 between a bottom surface of the second cladding layer 106 and the center of the tip 102a is greater than the thickness 106t of the second cladding layer 106. Thus, in some embodiments, the thickness 106t of the second cladding layer 106 is less than the thickness 104t of the first cladding layer so the distance 202 between the top surface of the first cladding layer 104 and the center of the tip 102a is approximately equal to the distance 204 between the bottom surface of the second cladding layer 106 and the center of the tip 102a. As a result, unnecessary material may be excluded from the second cladding layer 106 and thus a size of the semiconductor structure may be reduced.

In some embodiments, a process layer 206 is disposed directly over the first cladding layer 104 and the first dielectric layer 108. In some embodiments, the process layer 206 is a carrier layer comprising a semiconductor or some other suitable material. In some other embodiments, the process layer 206 is an adhesive layer comprising an ultraviolet (UV) curable tape or some other suitable material.

Figure 3:
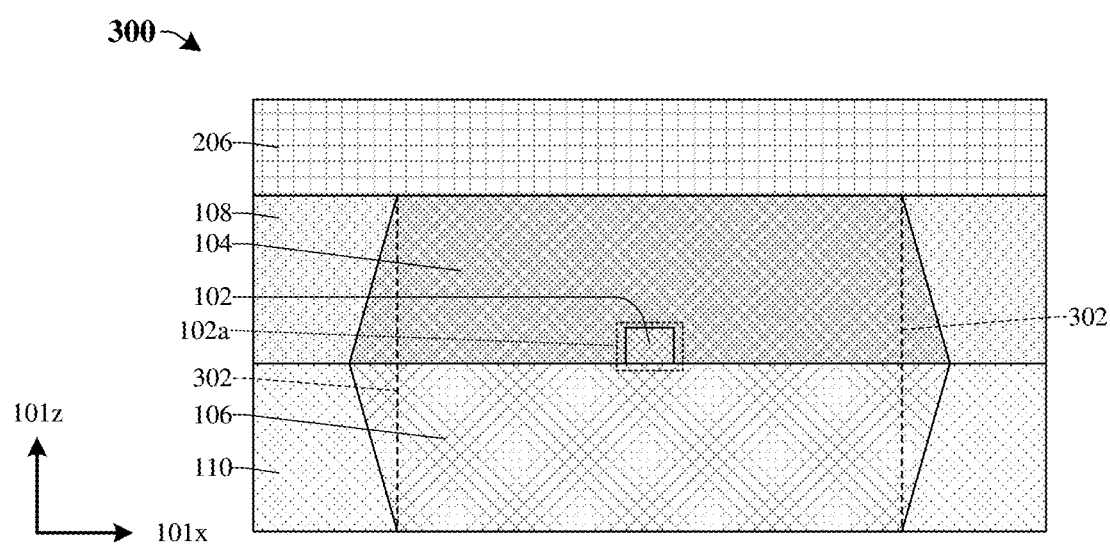
FIG. 3 illustrates a cross-sectional view of some embodiments of the semiconductor structure of FIG. 1A in which a top surface of the second cladding layer is wider than a bottom surface of the second cladding layer.

FIG. 3 illustrates a cross-sectional view 300 of some embodiments of the semiconductor structure of FIG. 1A in which a top surface of the second cladding layer 106 is wider than a bottom surface of the second cladding layer 106.

For example, the second cladding layer 106 illustrated in FIG. 3 is inverted relative to the second cladding layer 106 illustrated in FIG. 1A. The second cladding layer 106 may be inverted due to the process by which the second cladding layer 106 is formed (e.g., as shown in FIGS. 28A-32A). In some other embodiments, the first cladding layer 104 and the second cladding layer 106 have substantially vertical sidewalls, as illustrated by dashed lines 302.

Figure 4A:
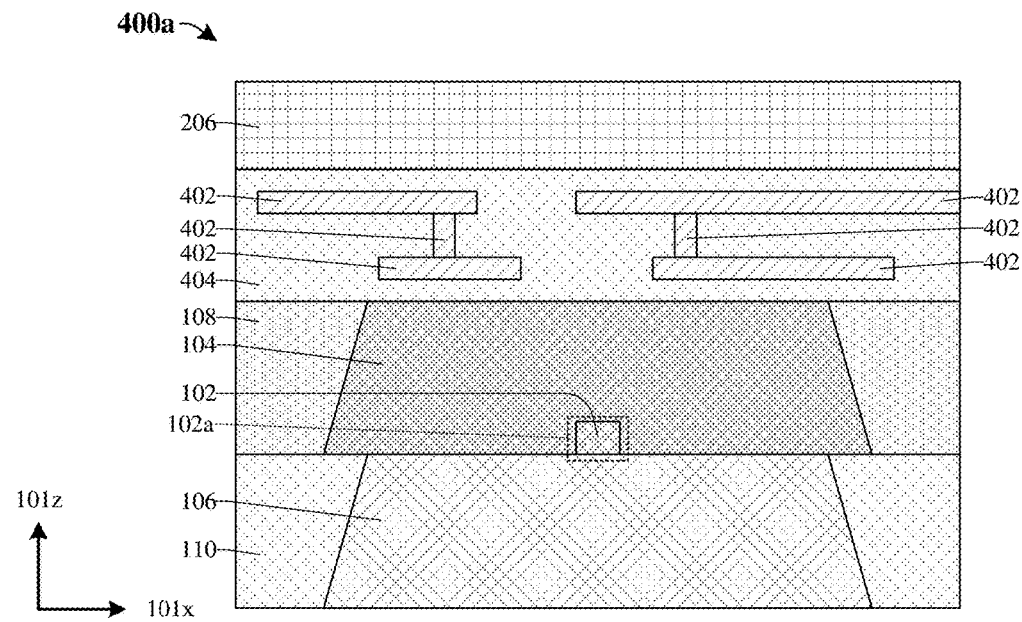
FIG. 4A and FIG. 4B illustrate cross-sectional views of some embodiments of the semiconductor structure of FIG. 1A and FIG. 1B, respectively, in which a plurality of conductive interconnects are disposed directly over the first cladding layer, the semiconductor waveguide layer, and the second cladding layer.
Figure 4B:
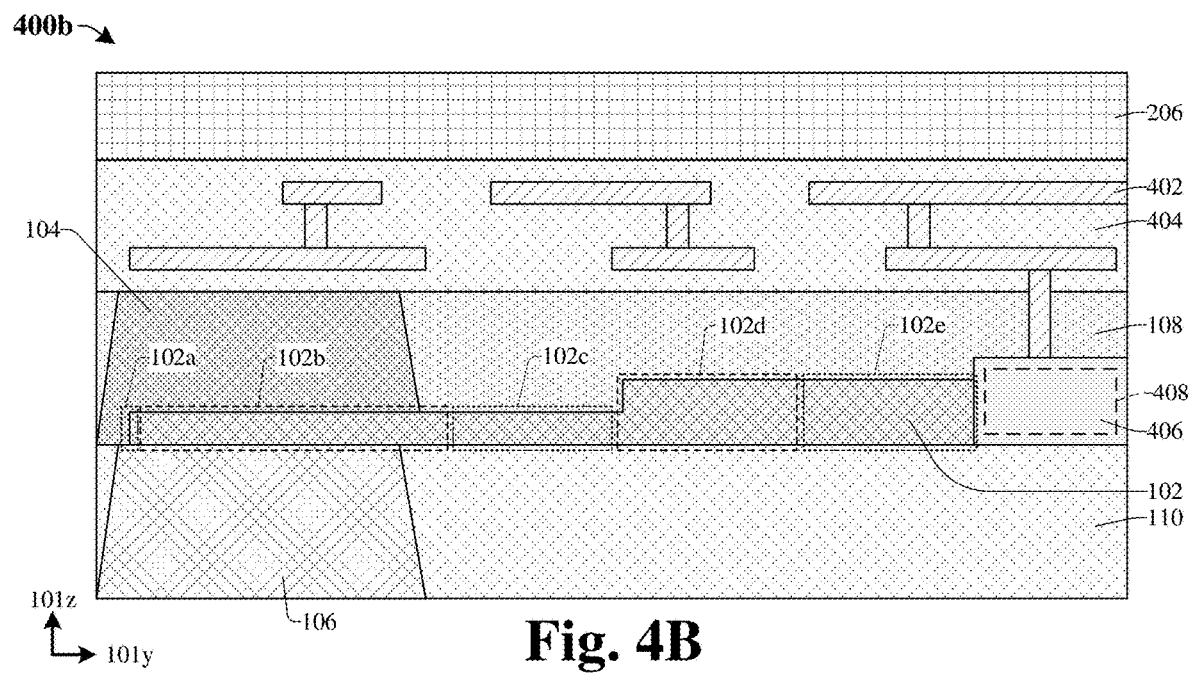

FIG. 4A and FIG. 4B illustrate cross-sectional views 400a, 400b of some embodiments of the semiconductor structure of FIG. 1A and FIG. 1B, respectively, in which a plurality of conductive interconnects 402 are disposed directly over the first cladding layer 104, the semiconductor waveguide layer 102, and the second cladding layer 106.

The conductive interconnects 402 are disposed within a dielectric structure 404 which comprises a plurality of dielectric layers. In some embodiments, the conductive interconnects 402 are disposed directly over the tip 102a of the semiconductor waveguide layer 102 and other segments of the semiconductor waveguide layer 102. The conductive interconnects 402 may, for example, include metal lines, metal vias, bond pads, contacts, or the like.

In some embodiments, the conductive interconnects 402 extend through the first dielectric layer 108 to a semiconductor device layer 406 that is adjacent to the semiconductor waveguide layer 102 (e.g., adjacent to the slab device segment 102e) and between the first dielectric layer 108 and the second dielectric layer 110. In some embodiments, a photodetector 408 (e.g., a photodiode, an avalanche photodiode, a single photon avalanche diode, or some other suitable photodetector) is disposed within the semiconductor device layer 406. The photodetector 408 is configured to detect optical radiation traveling through the semiconductor waveguide layer 102. In some embodiments, some of the conductive interconnects 402 are coupled directly to the semiconductor device layer 406 and/or the photodetector 408.

Figure 5A:
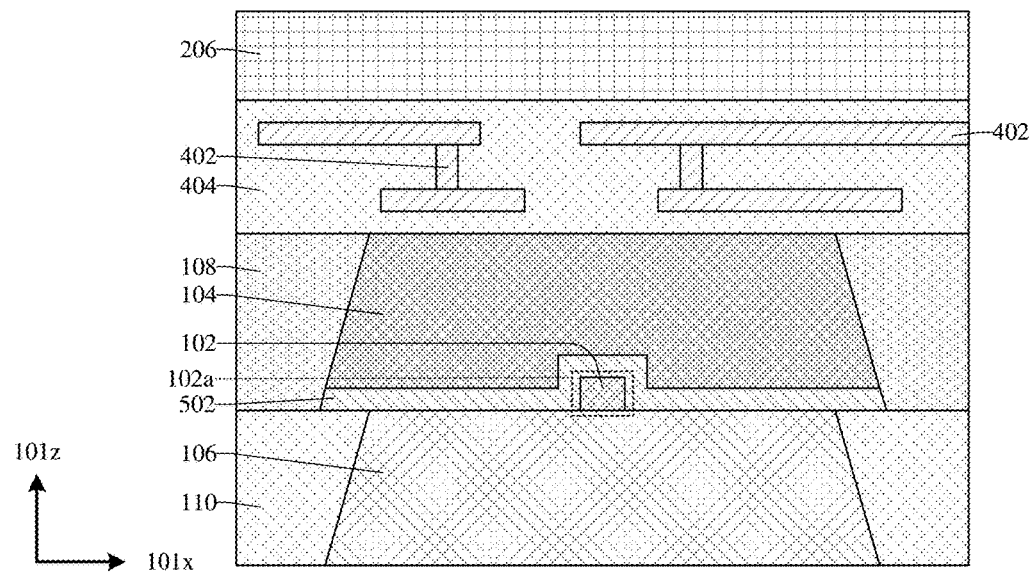
FIG. 5A and FIG. 5B illustrate cross-sectional views of some embodiments of the semiconductor structure of FIG. 1A and FIG. 1B, respectively, in which a buffer layer is directly between the semiconductor waveguide layer and the first cladding layer.
Figure 5B:
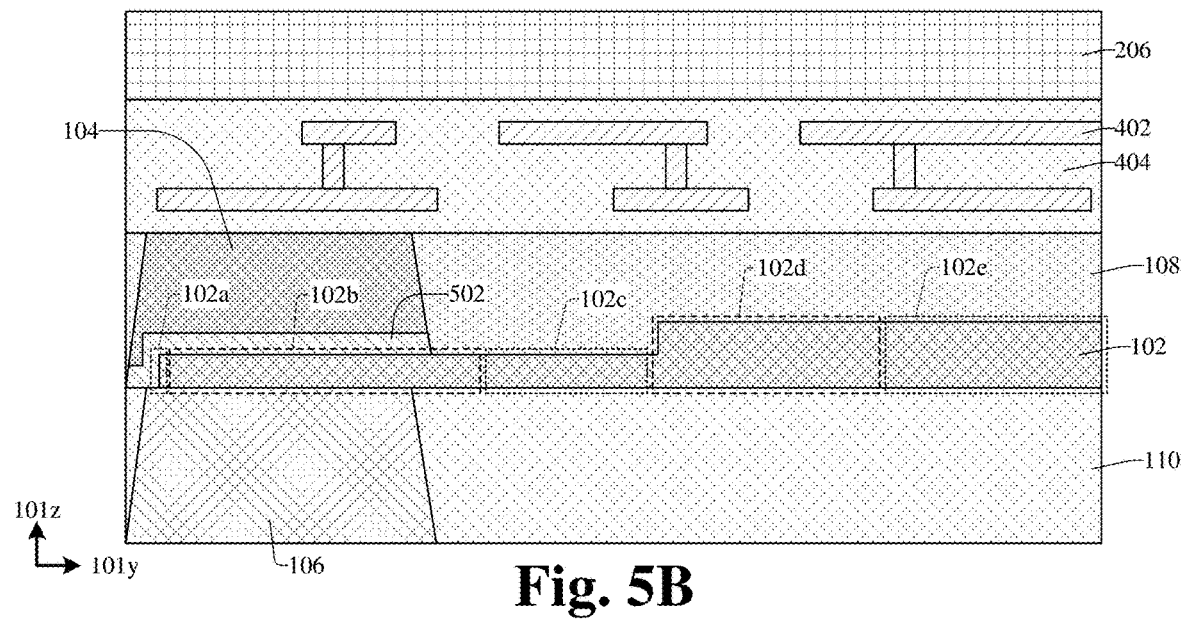

FIG. 5A and FIG. 5B illustrate cross-sectional views 500a, 500b of some embodiments of the semiconductor structure of FIG. 1A and FIG. 1B, respectively, in which a buffer layer 502 is directly between the semiconductor waveguide layer 102 and the first cladding layer 104.

The buffer layer 502 separates the semiconductor waveguide layer 102 from the first cladding layer 104. In some embodiments, the buffer layer 502 is directly over and on opposite sides of the tip 102a and the tapered transition segment 102b, but the buffer layer 502 is not directly over nor on opposite sides of other segments (e.g., 102c, 102d, 102e) of the semiconductor waveguide layer 102. The buffer layer 502 comprises a fifth dielectric, different from the third dielectric and the fourth dielectric. In some embodiments, sidewalls of the buffer layer 502 are approximately aligned (e.g., coplanar) with sidewalls of the first cladding layer 104.

The buffer layer 502 may reduce a stress put on the semiconductor waveguide layer 102 by the first cladding layer 104. For example, in some embodiments, the first cladding layer 104 comprises a harder dielectric than the first dielectric layer 108 and the buffer layer 502. Thus, the first cladding layer 104 may put stress on the semiconductor waveguide layer 102. However, by including the buffer layer 502 comprising the softer material between the semiconductor waveguide layer 102 and the first cladding layer 104, the stress put on the semiconductor waveguide layer 102 may be reduced.

A thickness of the buffer layer 502 is substantially less than the thickness of the first cladding layer 104 and the thickness of the semiconductor waveguide layer 102. For example, in some embodiments, the thickness of the buffer layer 502 is less than 5% of the thickness of the first cladding layer 104, less than 2.5% of the of the thickness of the first cladding layer 104, or some other suitable value. Thus, the buffer layer 502 may have little impact on the mode size expansion at the tip 102a and the overall size of the semiconductor structure.

In some embodiments, the buffer layer 502 may, for example, comprise silicon dioxide, silicon oxynitride, or some other suitable material. In some embodiments, the thickness of the buffer layer 502 ranges from about 5 nanometers to 30 nanometers, 10 nanometers to 25 nanometers, or some other suitable range.

Figure 6A:
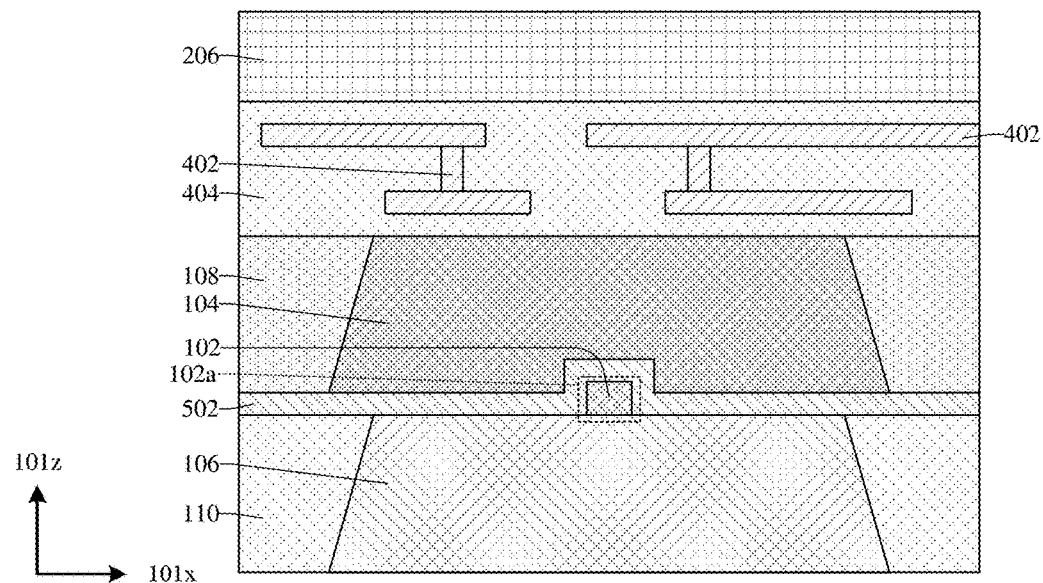
FIG. 6A and FIG. 6B illustrate cross-sectional views of some embodiments of the semiconductor structure of FIG. 5A and FIG. 5B, respectively, in which the buffer layer separates the first dielectric layer from the second dielectric layer.
Figure 6B:
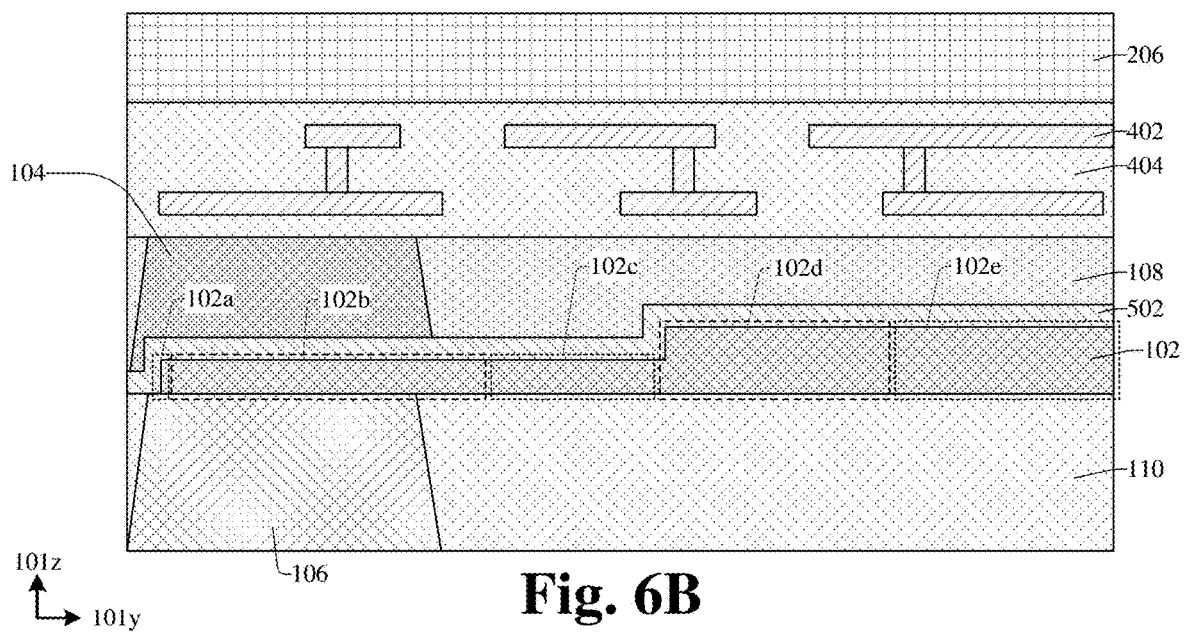

FIG. 6A and FIG. 6B illustrate cross-sectional views 600a, 600b of some embodiments of the semiconductor structure of FIG. 5A and FIG. 5B, respectively, in which the buffer layer 502 separates the first dielectric layer 108 from the second dielectric layer 110.

In some embodiments, the buffer layer 502 also separates the first dielectric layer 108 from the semiconductor waveguide layer 102, as illustrated in FIG. 6B. For example, in some embodiments, the buffer layer 502 extends along top surfaces and sidewalls of the tapered transition segment 102b, the slab transition segment 102c, the tapered device segment 102d, and the slab device segment 102e of the semiconductor waveguide layer 102 between said segments and the first dielectric layer 108.

Figure 7A:
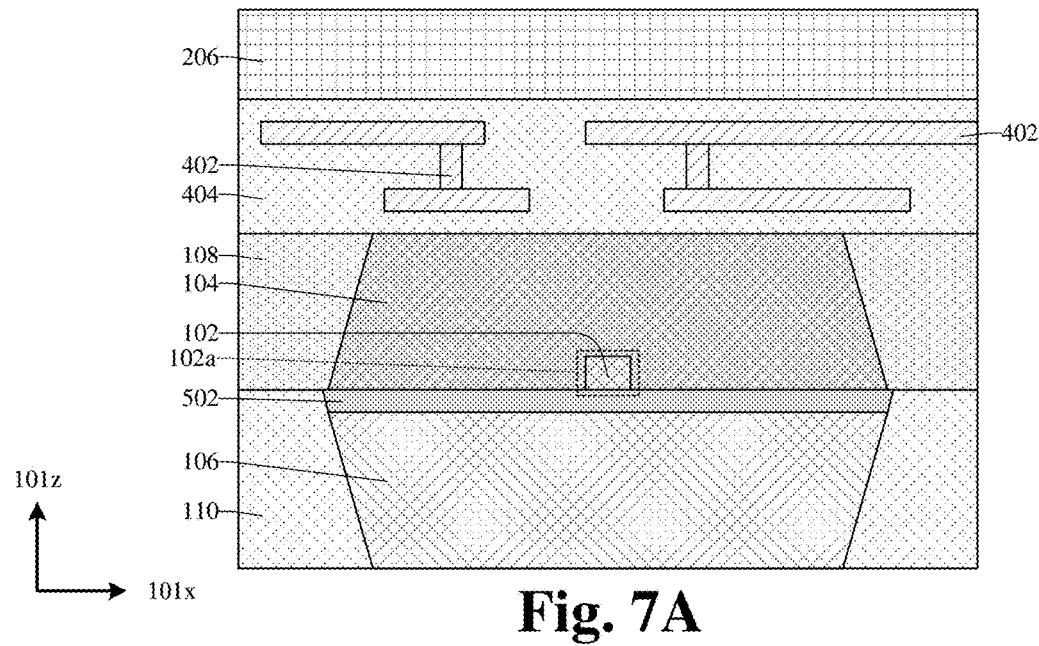
FIG. 7A and FIG. 7B illustrate cross-sectional views of some embodiments of the semiconductor structure of FIG. 5A and FIG. 5B, respectively, in which the buffer layer is directly between the semiconductor waveguide layer and the second cladding layer.
Figure 7B:
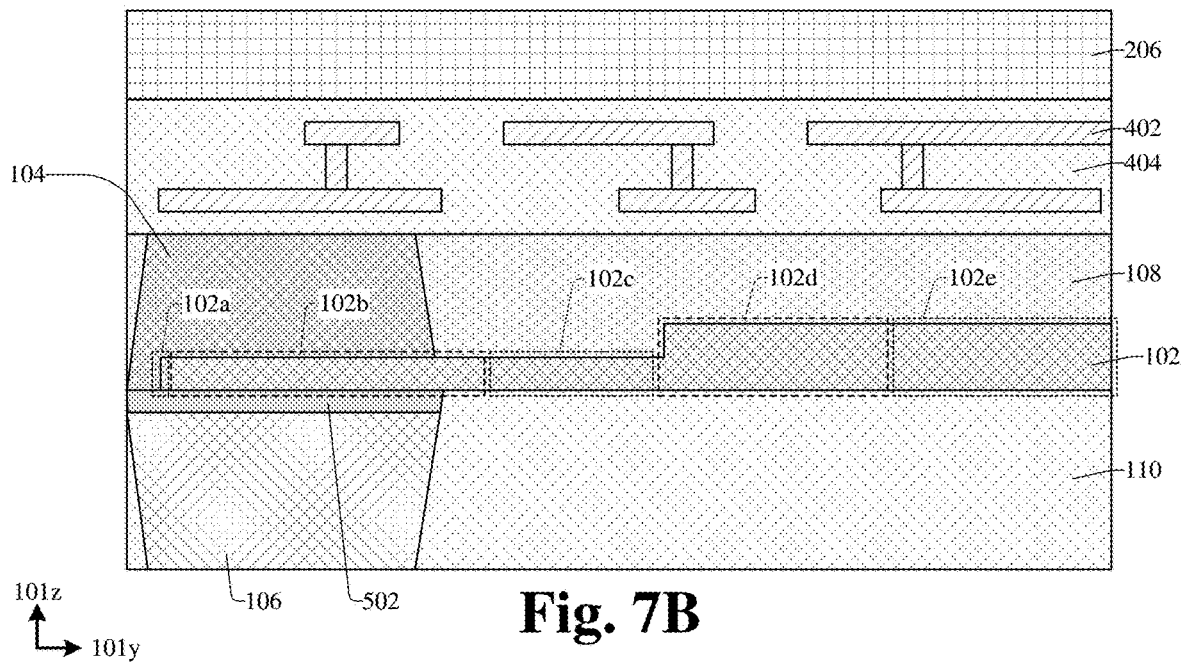

FIG. 7A and FIG. 7B illustrate cross-sectional views 700a, 700b of some embodiments of the semiconductor structure of FIG. 5A and FIG. 5B, respectively, in which the buffer layer 502 is directly between the semiconductor waveguide layer 102 and the second cladding layer 106.

The buffer layer 502 separates the semiconductor waveguide layer 102 from the second cladding layer 106. In some embodiments, the buffer layer 502 is directly under the tip 102a and the tapered transition segment 102b, but the buffer layer 502 is not directly under other segments (e.g., 102c, 102d, 102e) of the semiconductor waveguide layer 102. In some embodiments, sidewalls of the buffer layer 502 are approximately aligned (e.g., coplanar) with sidewalls of the second cladding layer 106. In some embodiments, the buffer layer 502 reduces a stress put on the semiconductor waveguide layer 102 by the second cladding layer 106.

Figure 8A:
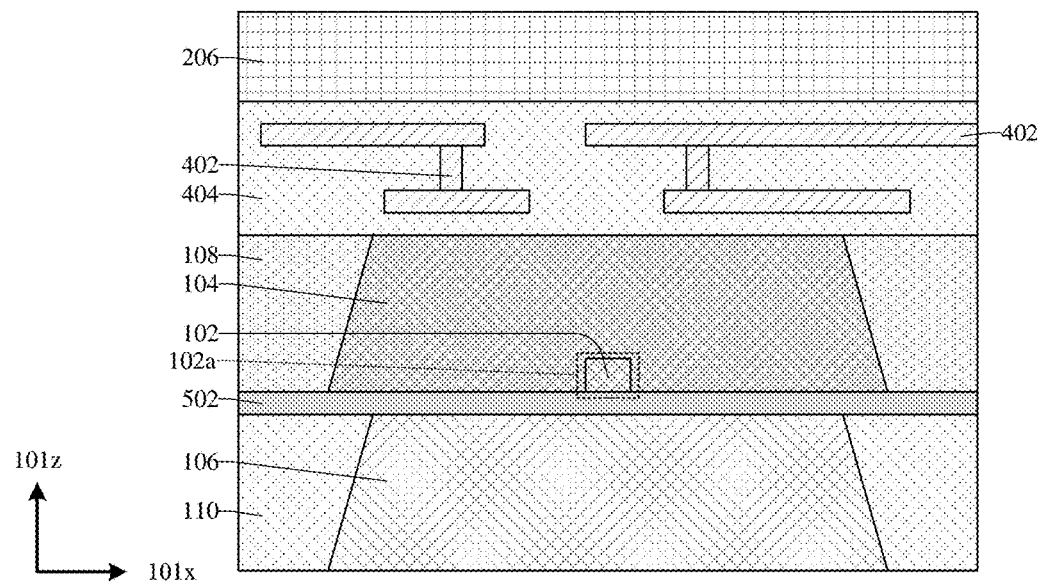
FIG. 8A and FIG. 8B illustrate cross-sectional views of some embodiments of the semiconductor structure of FIG. 7A and FIG. 7B, respectively, in which the buffer layer separates the first dielectric layer from the second dielectric layer.
Figure 8B:
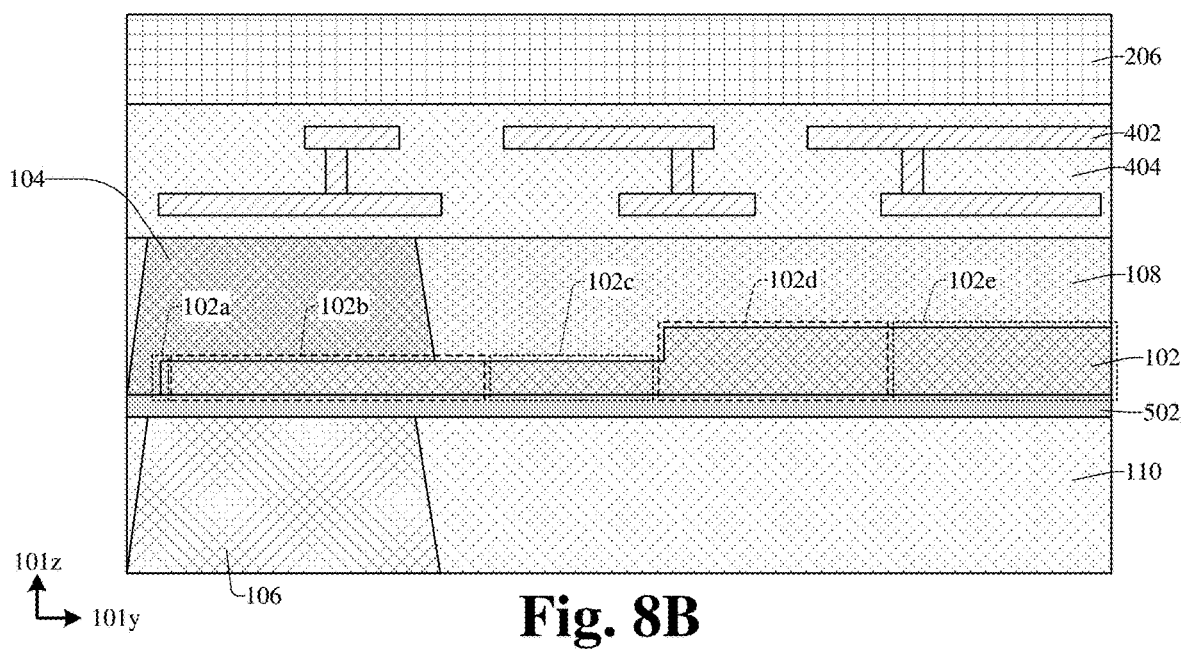

FIG. 8A and FIG. 8B illustrate cross-sectional views 800a, 800b of some embodiments of the semiconductor structure of FIG. 7A and FIG. 7B, respectively, in which the buffer layer 502 separates the first dielectric layer 108 from the second dielectric layer 110.

In some embodiments, the buffer layer 502 also separates the second dielectric layer 110 from the semiconductor waveguide layer 102. For example, in some embodiments, the buffer layer 502 extends along bottom surfaces of the tapered transition segment 102b, the slab transition segment 102c, the tapered device segment 102d, and the slab device segment 102e of the semiconductor waveguide layer 102 between said segments and the second dielectric layer 110.

Figure 9:
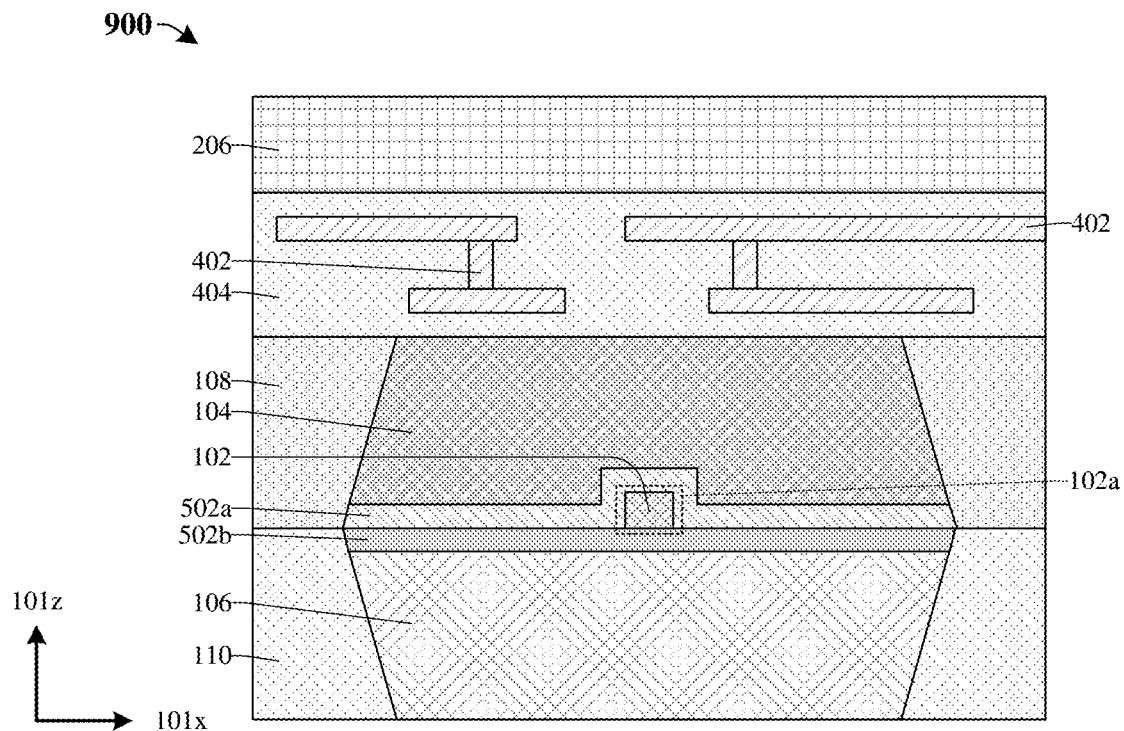
FIG. 9 and FIG. 10 illustrate cross-sectional views of some embodiments of the semiconductor structure of FIG. 1A in which a first buffer layer is directly between the semiconductor waveguide layer and the first cladding layer and a second buffer layer is directly between the semiconductor waveguide layer and the second cladding layer.
Figure 10:
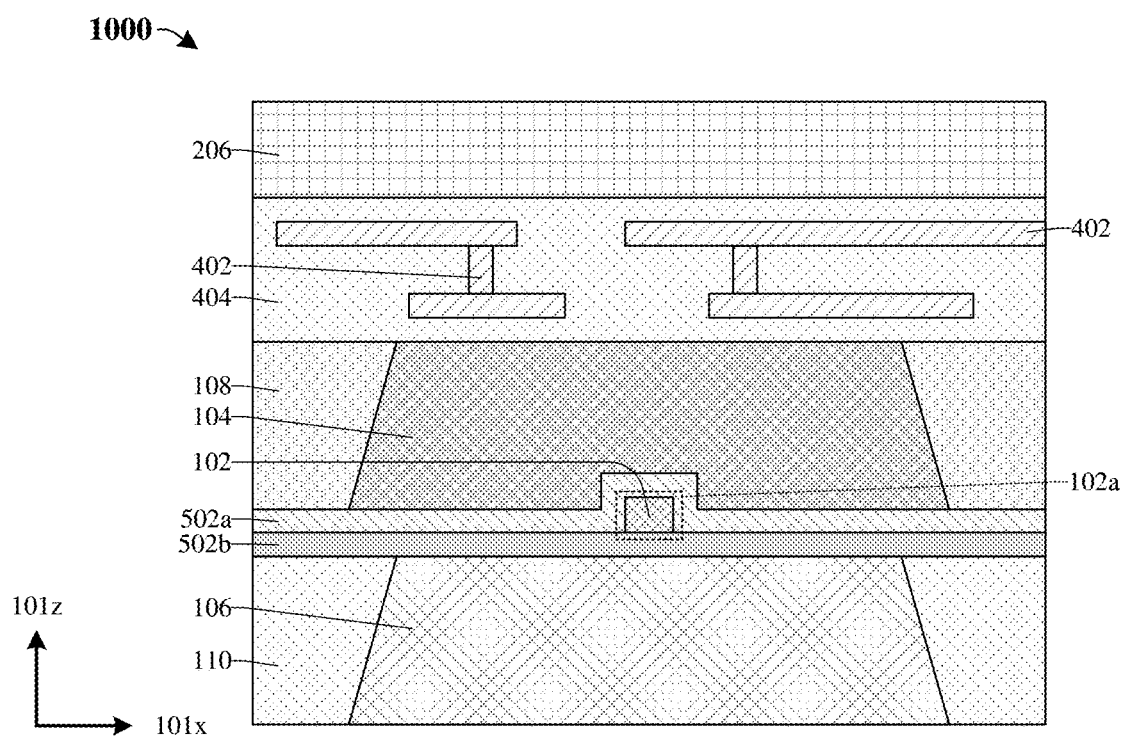

FIG. 9 and FIG. 10 illustrate cross-sectional views 900, 1000 of some embodiments of the semiconductor structure of FIG. 1A in which a first buffer layer 502a is directly between the semiconductor waveguide layer 102 and the first cladding layer 104 and a second buffer layer 502b is directly between the semiconductor waveguide layer 102 and the second cladding layer 106.

In some embodiments, the first buffer layer 502a and the second buffer layer 502b comprise a same dielectric material. In some other embodiments, the first buffer layer 502a and the second buffer layer 502b comprise different dielectric materials. In some embodiments, a thickness of the first buffer layer 502a is approximately equal to a thickness of the second buffer layer 502b.

FIGS. 11A, 12A, 13A, 14A, 15A, 16A, 17A, 18A, 19A, 20A, 21A, 22A, 23A, 24A, 25A, 26A, 27A, 28A, 29A, 30A, 31A, 32A illustrate cross-sectional views 1100a, 1200a, 1300a, 1400a, 1500a, 1600a, 1700a, 1800a, 1900a, 2000a, 2100a, 2200a, 2300a, 2400a, 2500a, 2600a, 2700a, 2800a, 2900a, 3000a, 3100a, 3200a and FIGS. 11B, 12B, 13B, 14B, 15B, 16B, 17B, 18B, 19B, 20B, 21B, 22B, 23B, 24B, 25B, 26B, 27B, 28B, 29B, 30B, 31B, 32B illustrate corresponding three-dimensional views 1100b, 1200b, 1300b, 1400b, 1500b, 1600b, 1700b, 1800b, 1900b, 2000b, 2100b, 2200b, 2300b, 2400b, 2500b, 2600b, 2700b, 2800b, 2900b, 3000b, 3100b, 3200b, respectively, of some embodiments of a method for forming a semiconductor structure comprising a semiconductor waveguide layer 102, a first cladding layer 104 along a first side 102j of the semiconductor waveguide layer 102, and a second cladding layer 106 along a second side 102k of the semiconductor waveguide layer 102. Although FIGS. 11A-32B are described in relation to a method, it will be appreciated that the structures disclosed in FIGS. 11A-32B are not limited to such a method, but instead may stand alone as structures independent of the method.

Figure 11A:
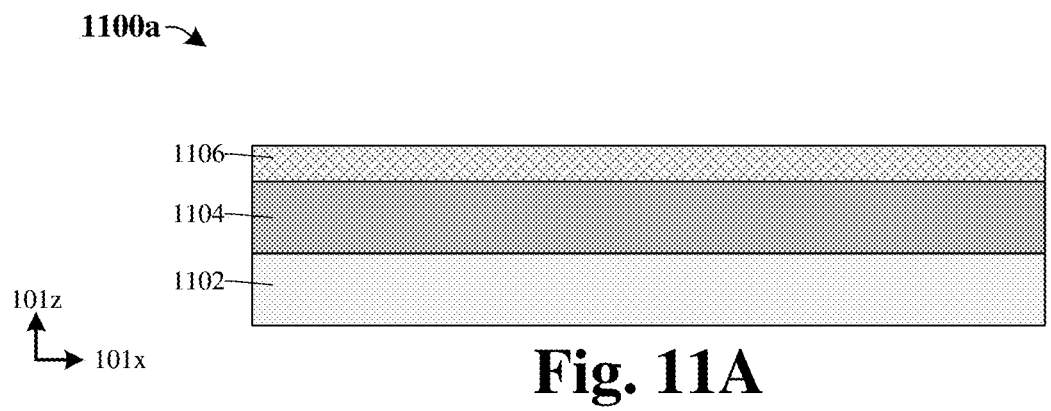
Figure 11B:
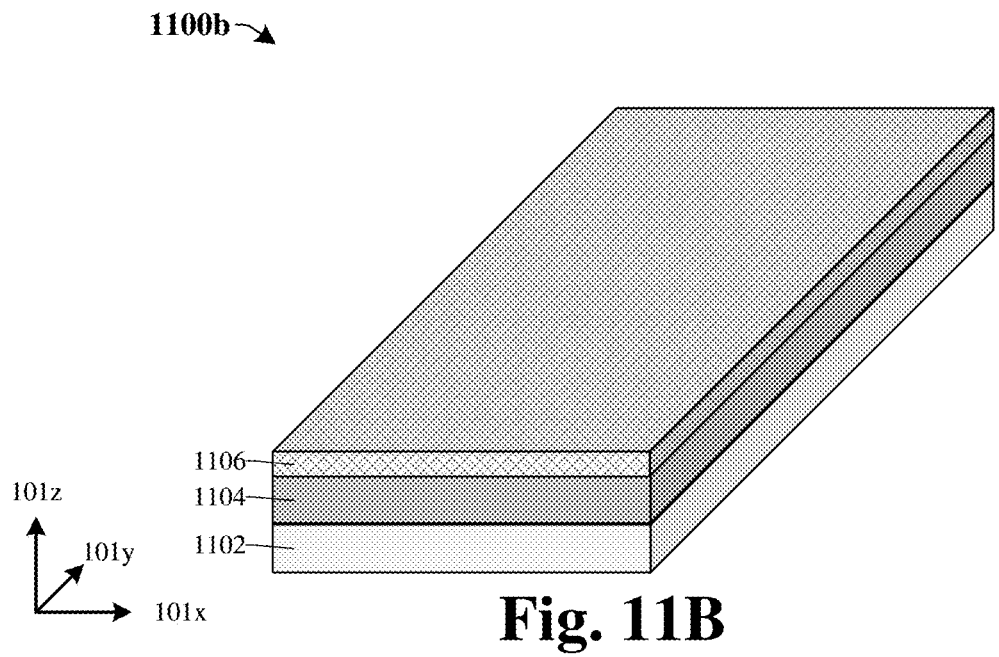

As shown in cross-sectional view 1100a of FIG. 11A and corresponding three-dimensional view 1100b of FIG. 11B, an SOI substrate (not labeled) is provided. The SOI substrate includes a buried dielectric layer 1104 over on a semiconductor substrate layer 1102 and an upper semiconductor layer 1106 over the buried dielectric layer 1104. In some embodiments, the buried dielectric layer has a thickness of less than about 5 micrometers or some other suitable value. In some other embodiments, the buried dielectric layer has a thickness of greater than about 5 micrometers or some other suitable value.

Figure 12A:
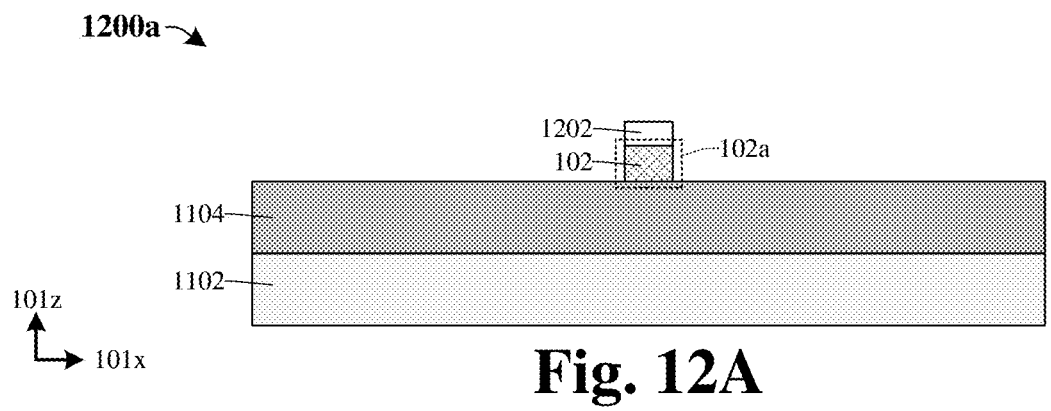
Figure 12B:
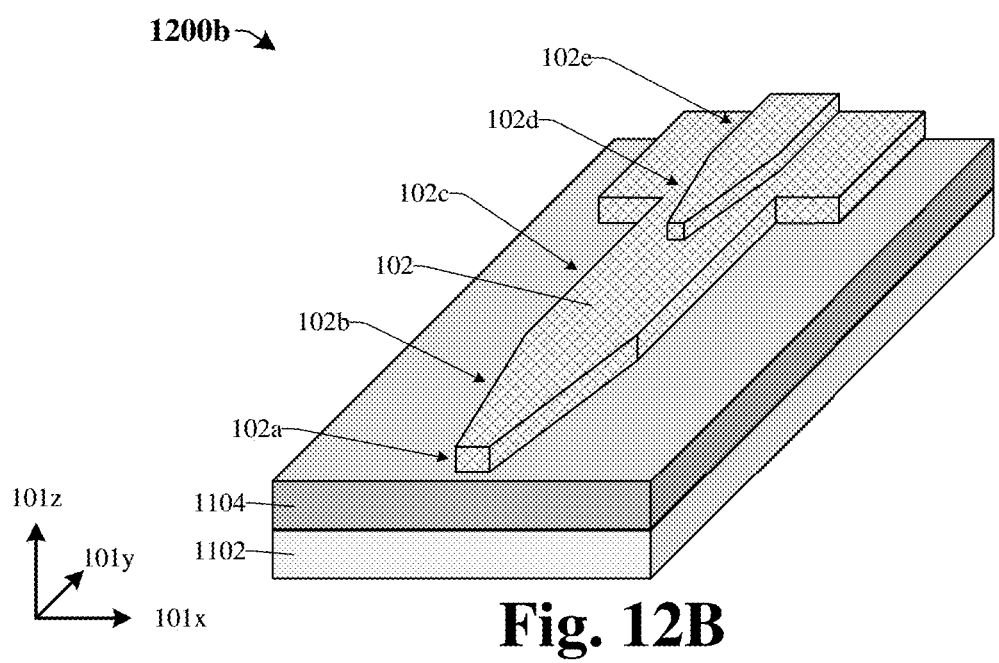

As shown in cross-sectional view 1200a of FIG. 12A and corresponding three-dimensional view 1200b of FIG. 12B, the upper semiconductor layer (e.g., 1106 of FIGS. 11A, 11B) is patterned to form the semiconductor waveguide layer 102 from the upper semiconductor layer. In some embodiments, the patterning comprises forming a masking layer 1202 over the upper semiconductor layer and etching the upper semiconductor layer according to the masking layer 1202. In some embodiments, the etching comprises a dry etching process (e.g., a plasma etching process, a reactive ion etching (RIE) process, an ion beam etching process, or some other dry etching process) or some other suitable process. In some embodiments, the masking layer 1202 comprises a photoresist layer, a hard mask layer, a combination of the foregoing, or some other suitable masking layer. In some embodiments, the masking layer 1202 is removed after and/or during the etching.

Figure 13A:
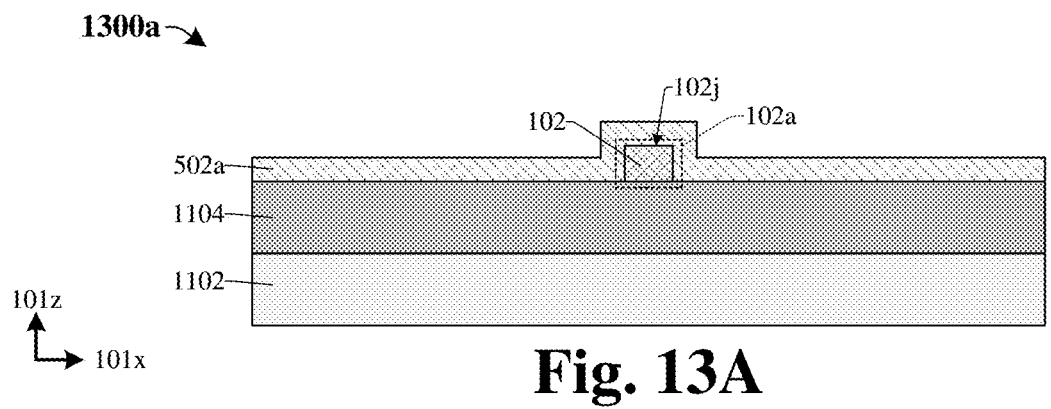
Figure 13B:
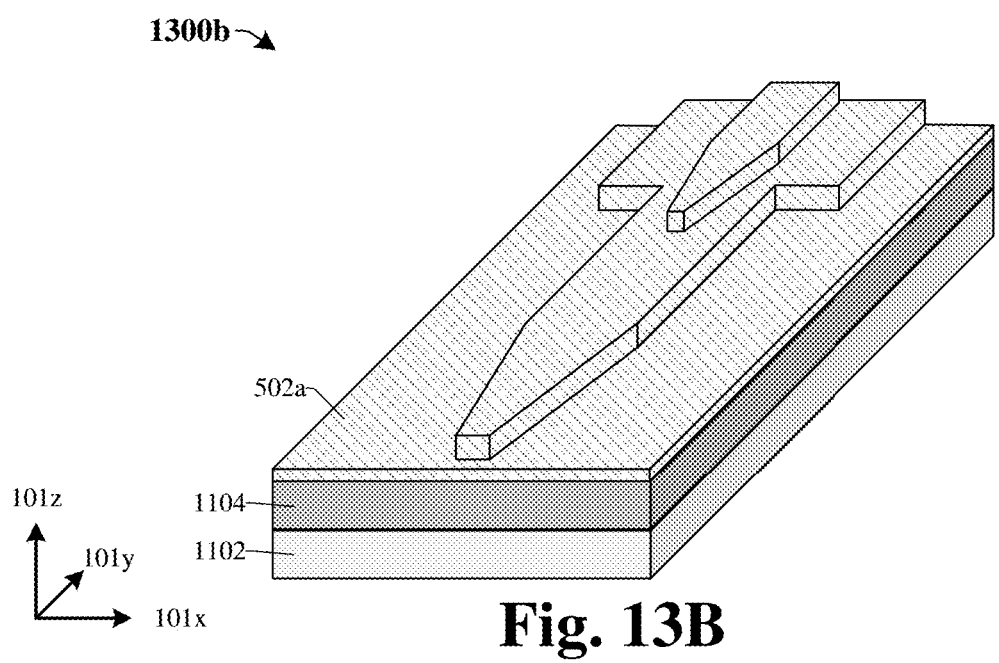

As shown in cross-sectional view 1300a of FIG. 13A and corresponding three-dimensional view 1300b of FIG. 13B, in some embodiments, a first buffer layer 502a is deposited over a first side 102j of the semiconductor waveguide layer 102 and over the buried dielectric layer 1104. In some embodiments, the first buffer layer 502a may, for example, comprise silicon dioxide, silicon oxynitride, or some other suitable material and may be deposited by a chemical vapor deposition (CVD) process, a physical vapor deposition (PVD) process, an atomic layer deposition (ALD) process, or some other suitable process. In some embodiments, a thickness of the first buffer layer 502a ranges from about 5 nanometers to 30 nanometers, 10 nanometers to 25 nanometers, or some other suitable range. In some other embodiments, the first buffer layer 502a is not formed over the semiconductor waveguide layer 102 and the method proceeds to FIGS. 14A, 14B.

Figure 14A:
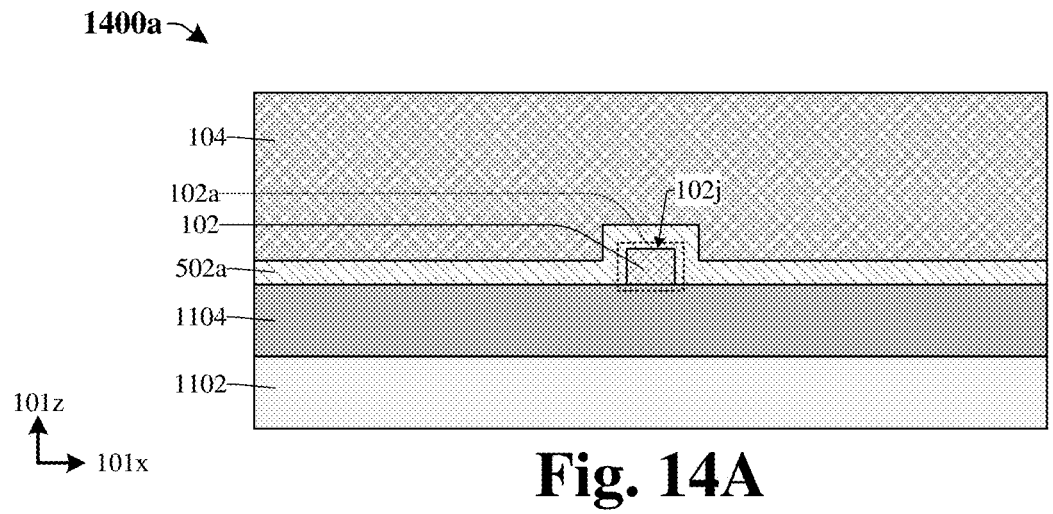
Figure 14B:
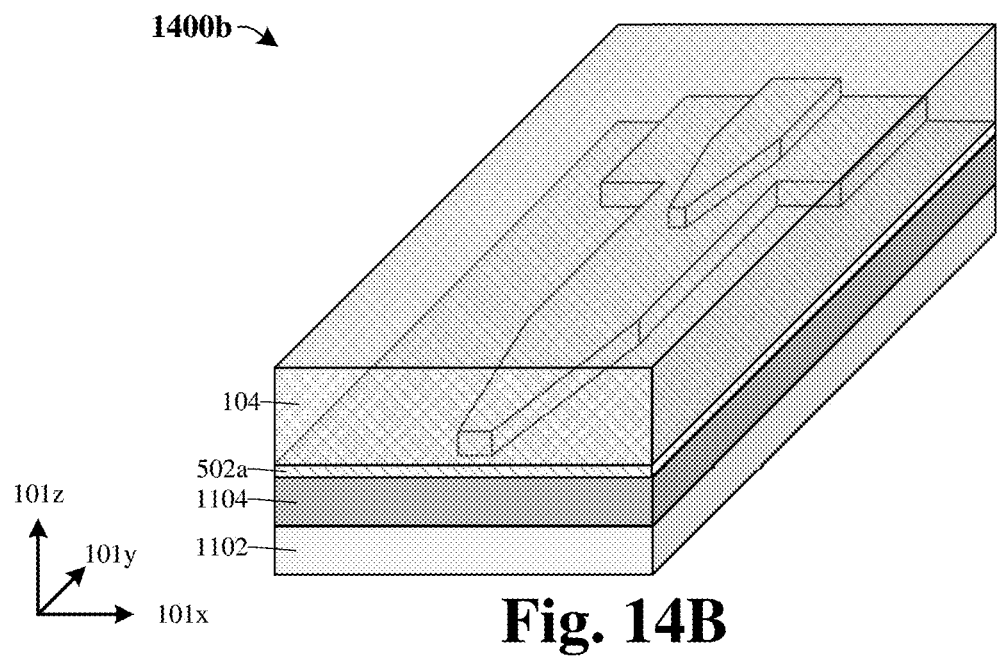

As shown in cross-sectional view 1400a of FIG. 14A and corresponding three-dimensional view 1400b of FIG. 14B, a first cladding layer 104 is deposited over the first side 102j of the semiconductor waveguide layer 102, the buried dielectric layer 1104, and the first buffer layer 502a. In some embodiments, the first cladding layer 104 is deposited directly on the first buffer layer 502a. In some other embodiments, the first cladding layer 104 is deposited directly on the semiconductor waveguide layer 102 and the buried dielectric layer 1104. The first cladding layer 104 comprises a dielectric material having a refractive index that is substantially similar to the refractive index of the semiconductor waveguide layer 102. For example, the first cladding layer 104 may comprise silicon nitride, hafnium oxide, or some other suitable material. In some embodiments, the first cladding layer 104 may, for example, be deposited by a CVD process, a PVD process, an ALD process, or some other suitable process. In some embodiments, a thickness of the first cladding layer 104 ranges from about 2 micrometers to 5 micrometers, 3 micrometers to 5 micrometers, or some other suitable range.

Figure 15A:
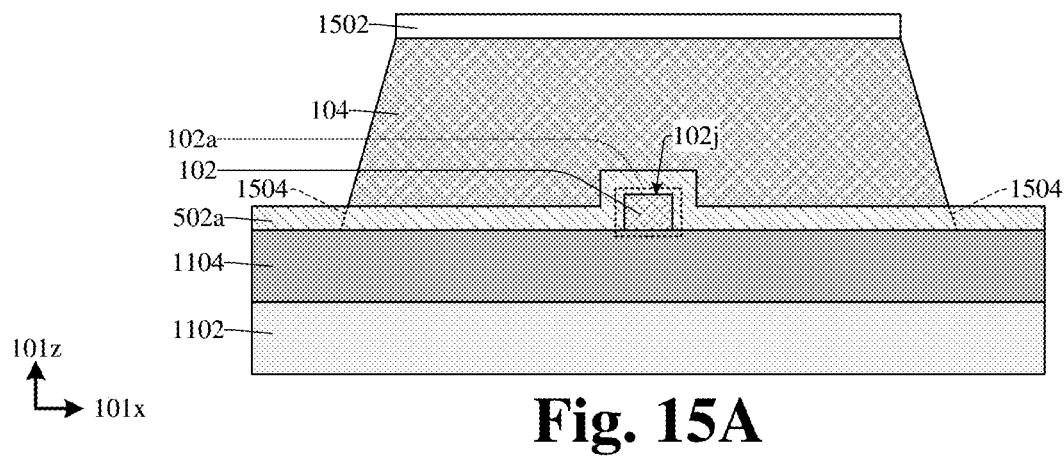
Figure 15B:
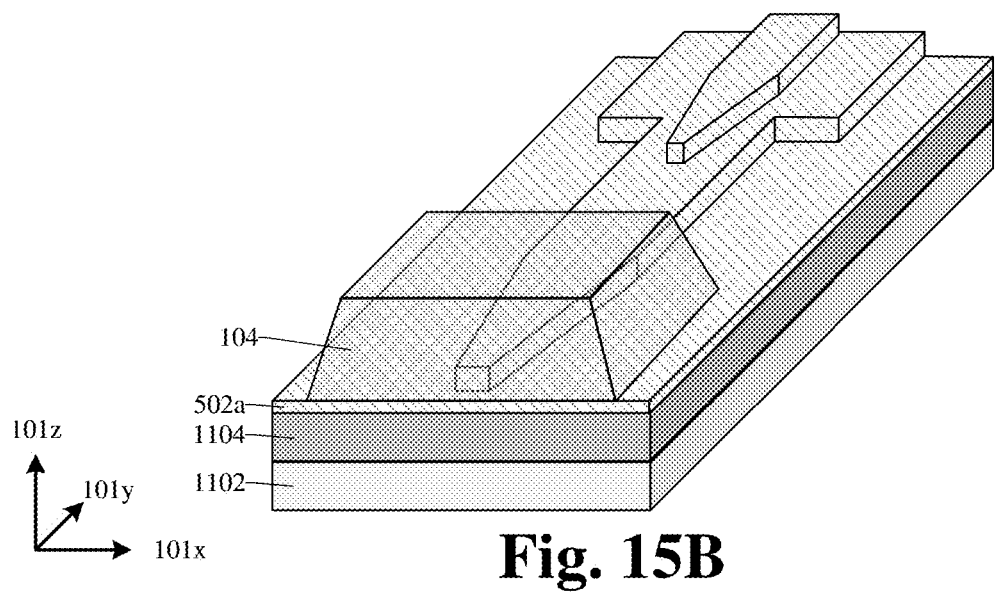

As shown in cross-sectional view 1500a of FIG. 15A and corresponding three-dimensional view 1500b of FIG. 15B, the first cladding layer 104 is patterned to remove the first cladding layer 104 from over segments of the semiconductor waveguide layer 102 (e.g., the slab transition segment 102c, the tapered device segment 102d, and the slab device segment 102e of FIGS. 1A-1D) not including the tip 102a and the tapered transition segment (e.g., 102b of FIGS. 1A-1D). Thus, after the patterning, the tip 102a and tapered transition segment (e.g., 102b of FIGS. 1A-1D) are covered by the first cladding layer 104 while the other segments (e.g., 102c, 102d, 102e of FIGS. 1A-1D) of the semiconductor waveguide layer 102 are not covered by the first cladding layer 104. In some embodiments, the patterning comprises forming a masking layer 1502 over the first cladding layer 104 and etching the first cladding layer 104 according to the masking layer 1502. In some embodiments, the etching comprises a dry etching process or some other suitable process. In some embodiments, the masking layer 1502 comprises a photoresist layer, a hard mask layer, a combination of the foregoing, or some other suitable masking layer. In some embodiments, the masking layer 1502 is removed after and/or during the etching.

In some embodiments, the first buffer layer 502a is also etched according to the masking layer 1502 to remove the first buffer layer 502a from over segments of the semiconductor waveguide layer 102 (e.g., 102c, 102d, 102e of FIGS. 1A-1D) not including the tip 102a and the tapered transition segment (e.g., 102b of FIGS. 1A-1D). In some embodiments, sidewalls of the first buffer layer 502a are approximately aligned with sidewalls of the first cladding layer 104 as illustrated, for example, by dashed lines 1504 and as shown in FIGS. 5A, 5B.

Figure 16A:
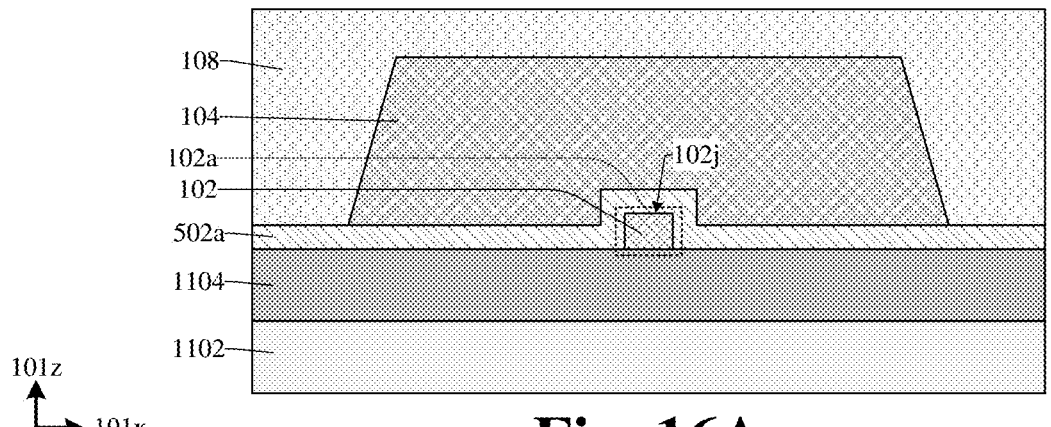
Figure 16B:
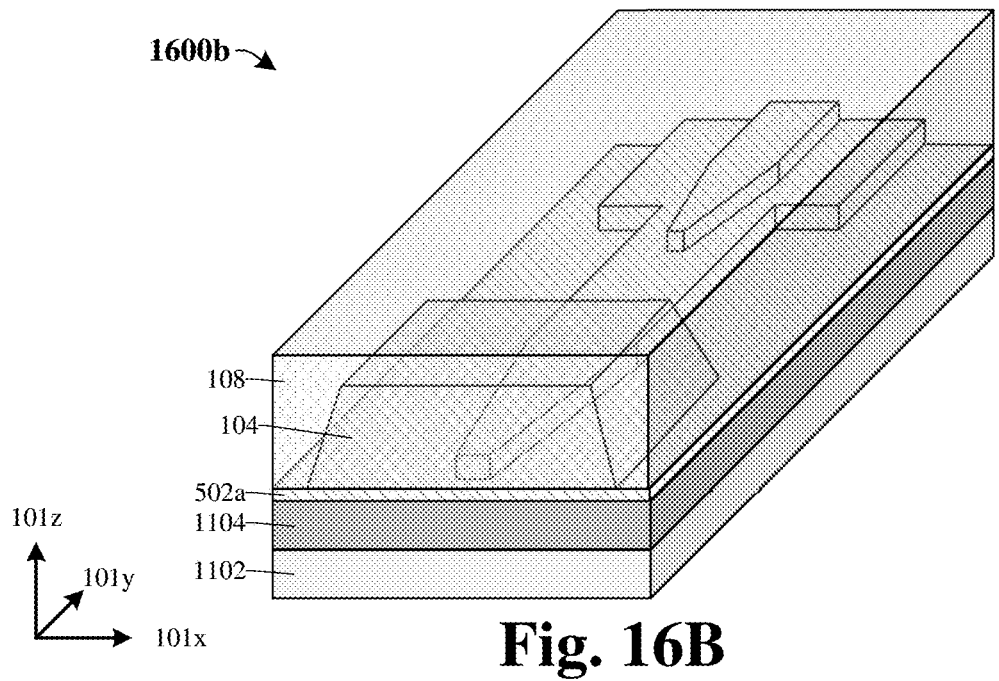

As shown in cross-sectional view 1600a of FIG. 16A and corresponding three-dimensional view 1600b of FIG. 16B, a first dielectric layer 108 is deposited over the first cladding layer 104 and the first side 102j of the semiconductor waveguide layer 102. In some embodiments, the first dielectric layer 108 is deposited directly on the first buffer layer 502a. In some other embodiments, the first dielectric layer 108 is deposited directly on the buried dielectric layer 1104 and segments of the semiconductor waveguide layer 102 not covered by the first cladding layer 104, as shown in FIGS. 1A, 1B and/or FIGS. 5A, 5B. In some embodiments, the first dielectric layer 108 may, for example, comprise silicon dioxide or some other suitable material and may be deposited by a CVD process, a PVD process, an ALD process, or some other suitable process.

Figure 17A:
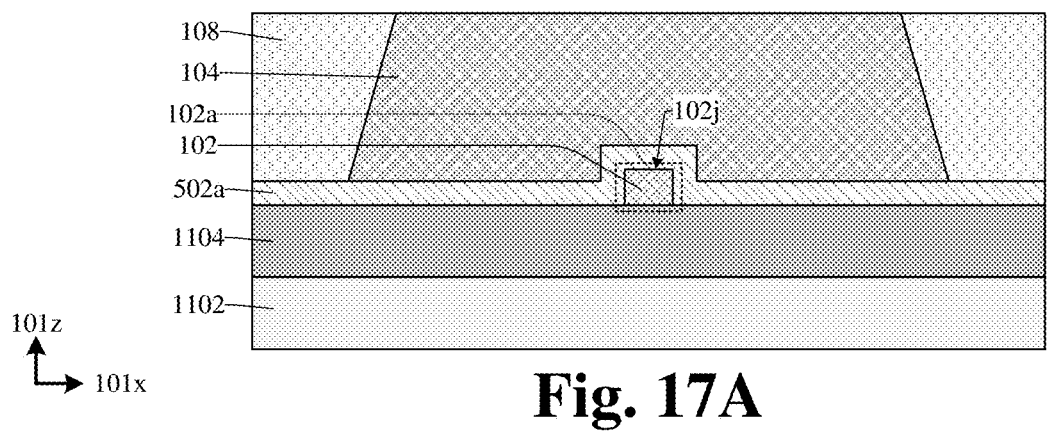
Figure 17B:
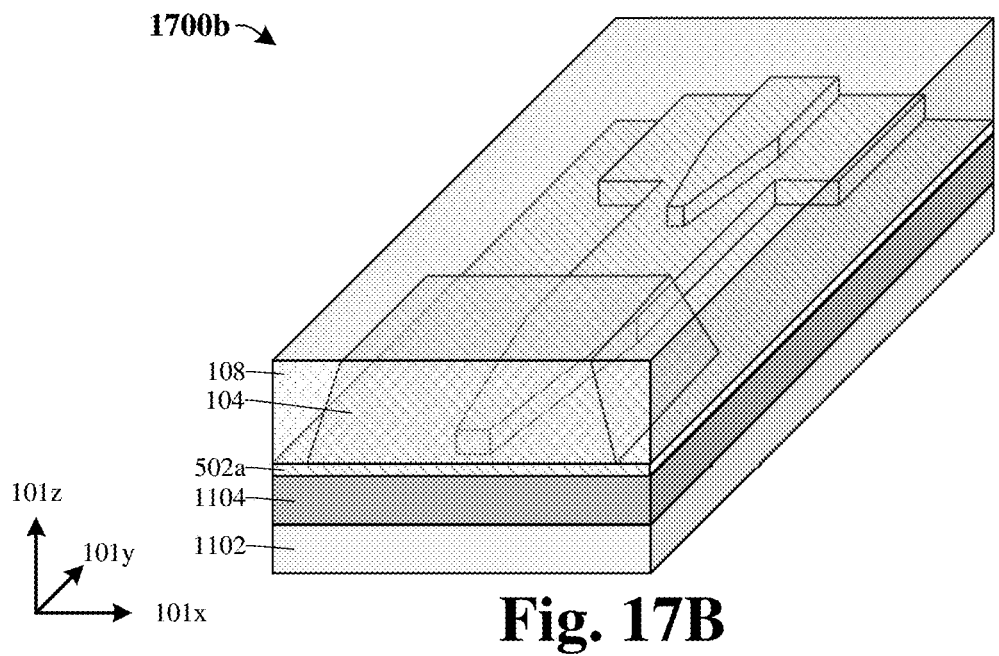

As shown in cross-sectional view 1700a of FIG. 17A and corresponding three-dimensional view 1700b of FIG. 17B, a planarization process is performed on the first dielectric layer 108. In some embodiments, the planarization process comprises a chemical mechanical planarization (CMP) or some other suitable process. In some embodiments, the planarization process is also performed on the first cladding layer 104. In some embodiments, a top surface of the first dielectric layer 108 and a top surface of the first cladding layer 104 are approximately coplanar as a result of the planarization process. In some embodiments, the planarization process may alternatively be referred to as a polishing process or the like.

Figure 18A:
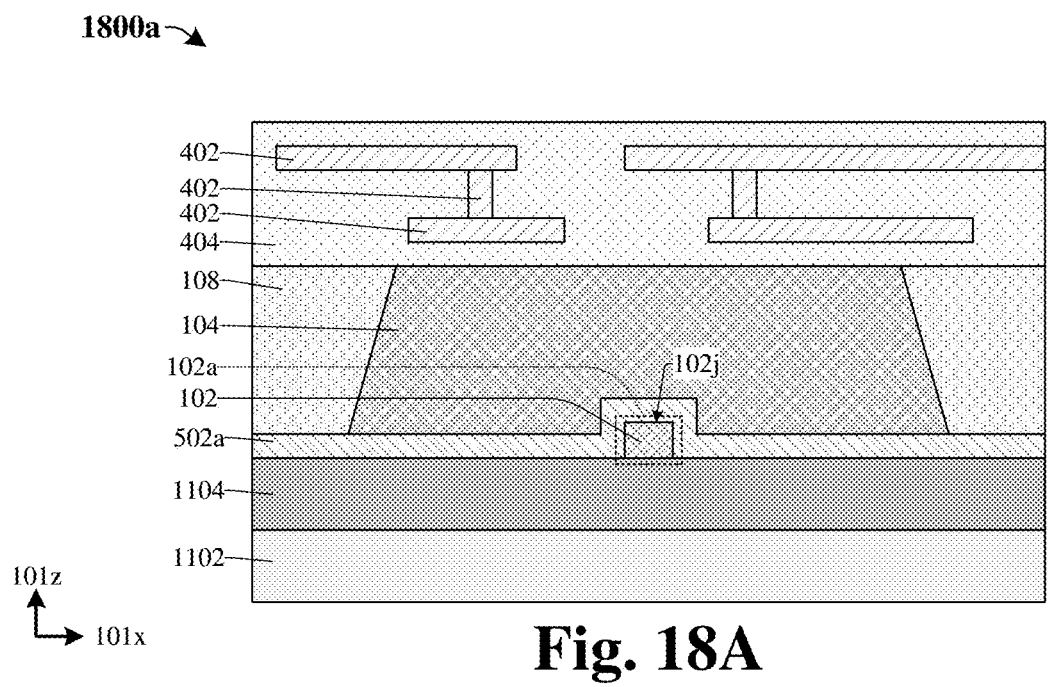
Figure 18B:
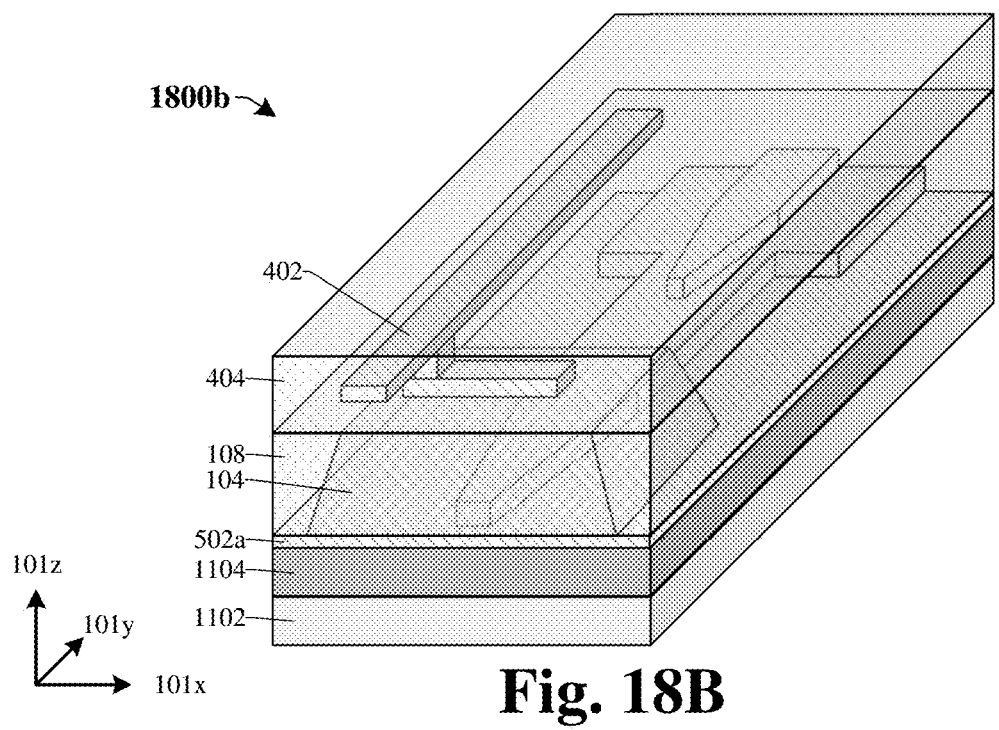

As shown in cross-sectional view 1800a of FIG. 18A and corresponding three-dimensional view 1800b of FIG. 18B, in some embodiments, an interconnect structure comprising a plurality of conductive interconnects 402 is formed within a dielectric structure 404 over the first dielectric layer 108 and over the first cladding layer 104. In some embodiments, the dielectric structure 404 is formed by depositing dielectric layers over the first dielectric layer 108 and the first cladding layer 104. In some embodiments, the conductive interconnects 402 are formed within the dielectric structure 404 by etching the dielectric layers and subsequently depositing conductive materials over the etched dielectric layers. In some embodiments, the dielectric layers of the dielectric structure 404 may, for example, comprise silicon dioxide, silicon nitride, silicon carbide, or some other suitable material and may be deposited by one or more CVD processes, PVD processes, ALD processes, or some other suitable processes. In some embodiments, the conductive interconnects 402 may, for example, comprise copper, tungsten, aluminum, or some other suitable material and may be deposited by a CVD process, a PVD process, an ALD process, a sputtering process, or some other suitable process.

Figure 19A:
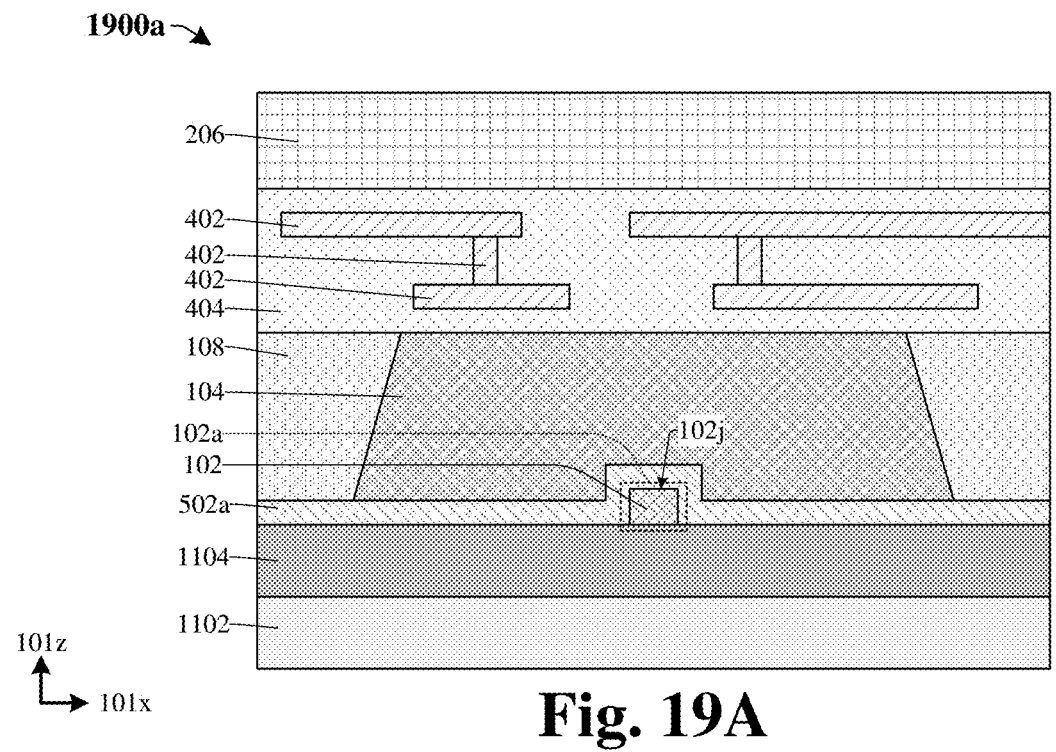
Figure 19B:
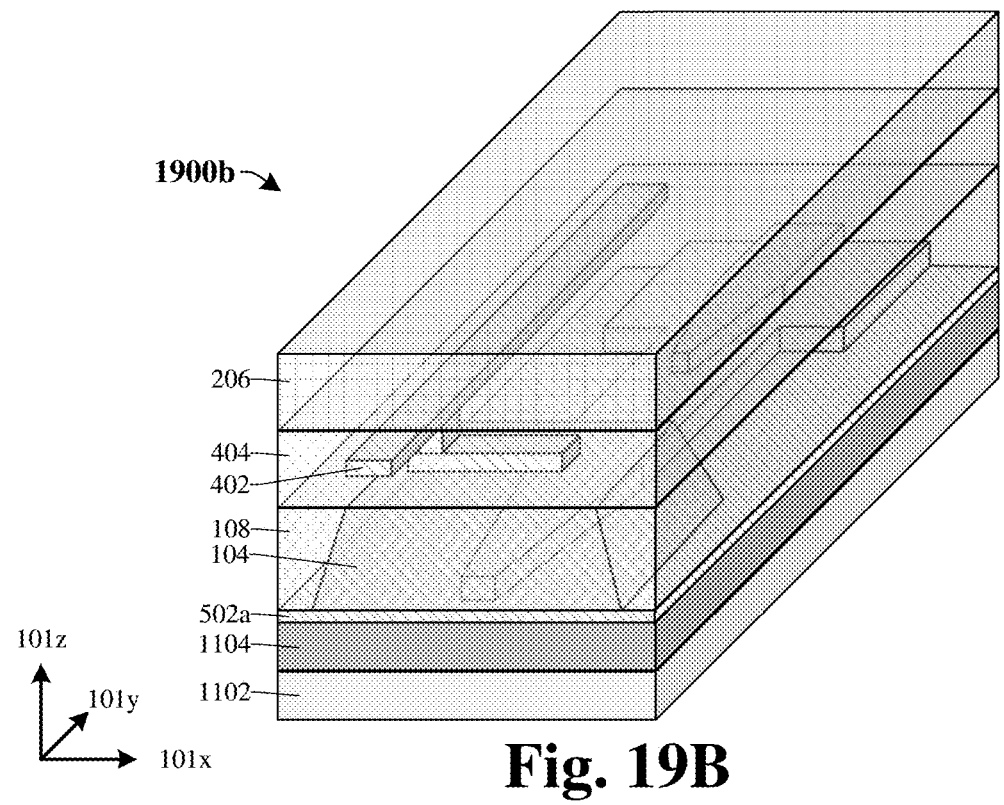

As shown in cross-sectional view 1900a of FIG. 19A and corresponding three-dimensional view 1900b of FIG. 19B, a process layer 206 is formed over the first dielectric layer 108, the first cladding layer 104, and over the dielectric structure 404. In some embodiments, the process layer 206 is a carrier layer comprising a semiconductor or some other material and is attached (e.g., by way of a bonding process or the like) to the dielectric structure 404 or the first dielectric layer 108. In some other embodiments, the process layer 206 is an adhesive layer comprising a UV curable tape or some other material and is attached (e.g., by way of an adhesion process or the like) to the dielectric structure 404 or the first dielectric layer 108.

Figure 20A:
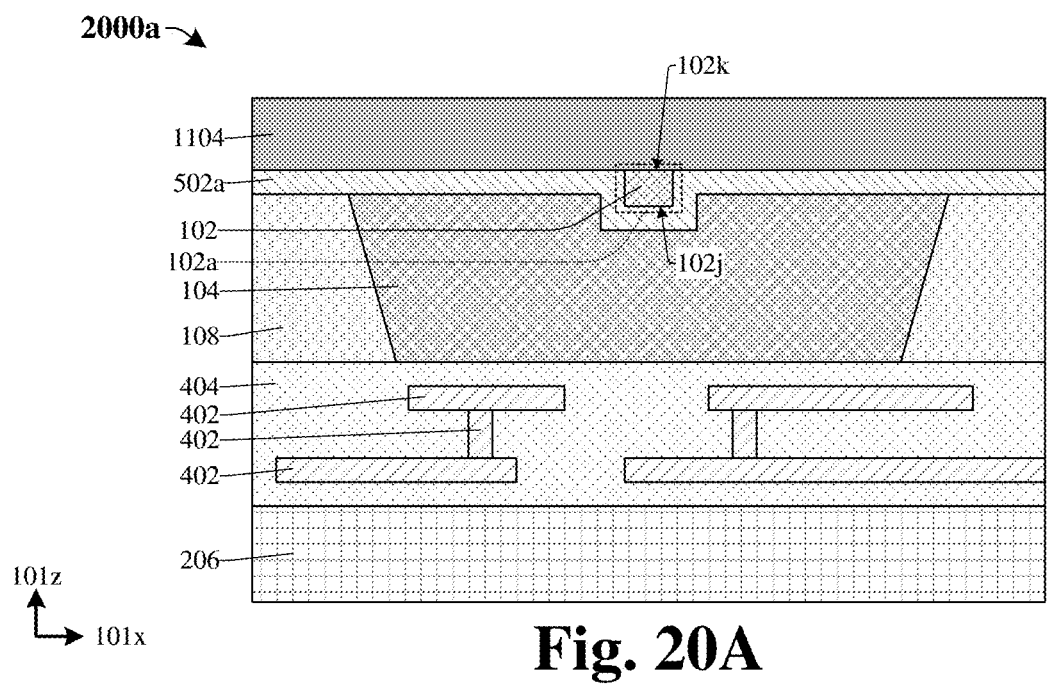
Figure 20B:
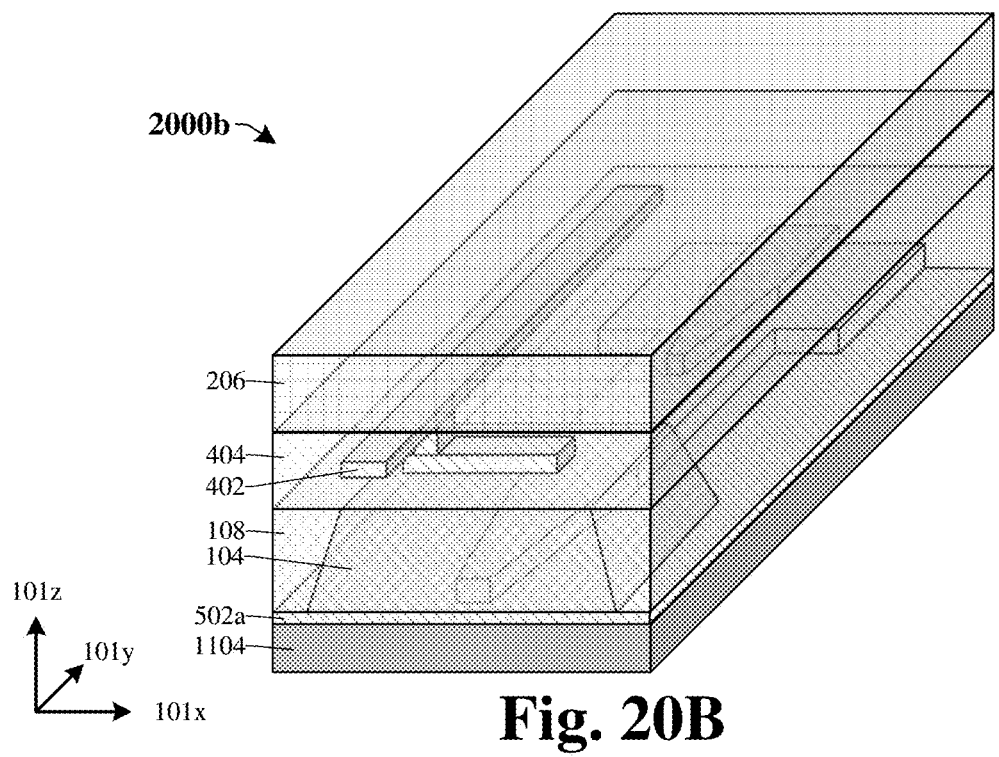

As shown in cross-sectional view 2000a of FIG. 20A and corresponding three-dimensional view 2000b of FIG. 20B, the semiconductor substrate layer (e.g., 1102 of FIGS. 19A, 19B) is removed from over a second side 102k of the semiconductor waveguide layer 102 and from over the buried dielectric layer 1104 (or from under the buried dielectric layer 1104, as shown in FIG. 20B, depending on orientation). In some embodiments, removing the semiconductor substrate layer comprises performing a grinding process or the like on the semiconductor substrate layer. In some other embodiments, removing the semiconductor substrate layer comprises etching the semiconductor substrate layer.

Figure 21A:
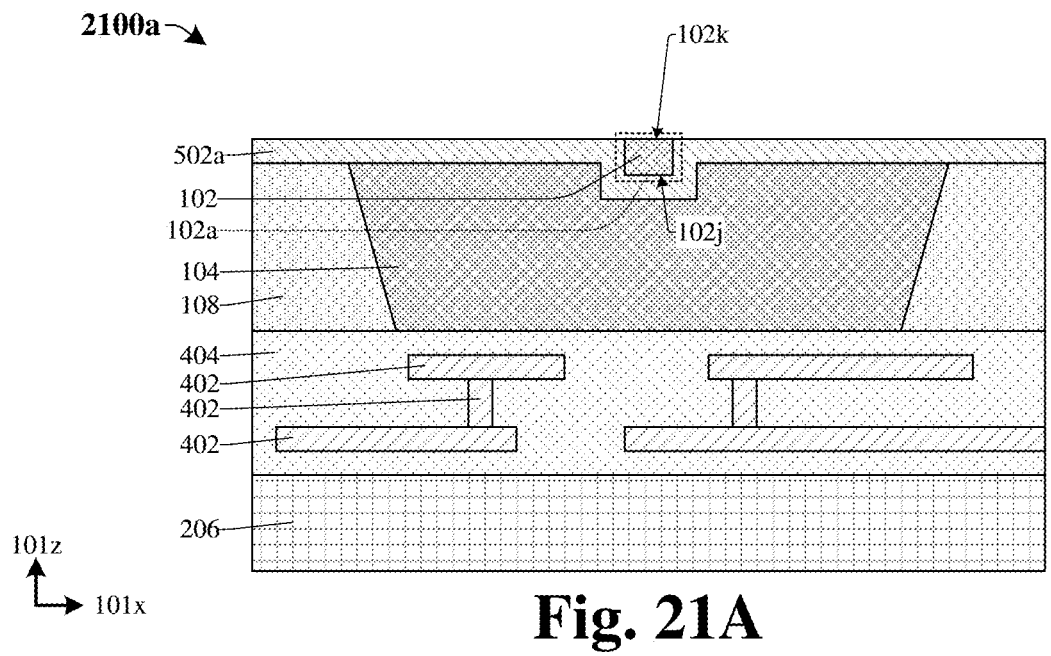
Figure 21B:
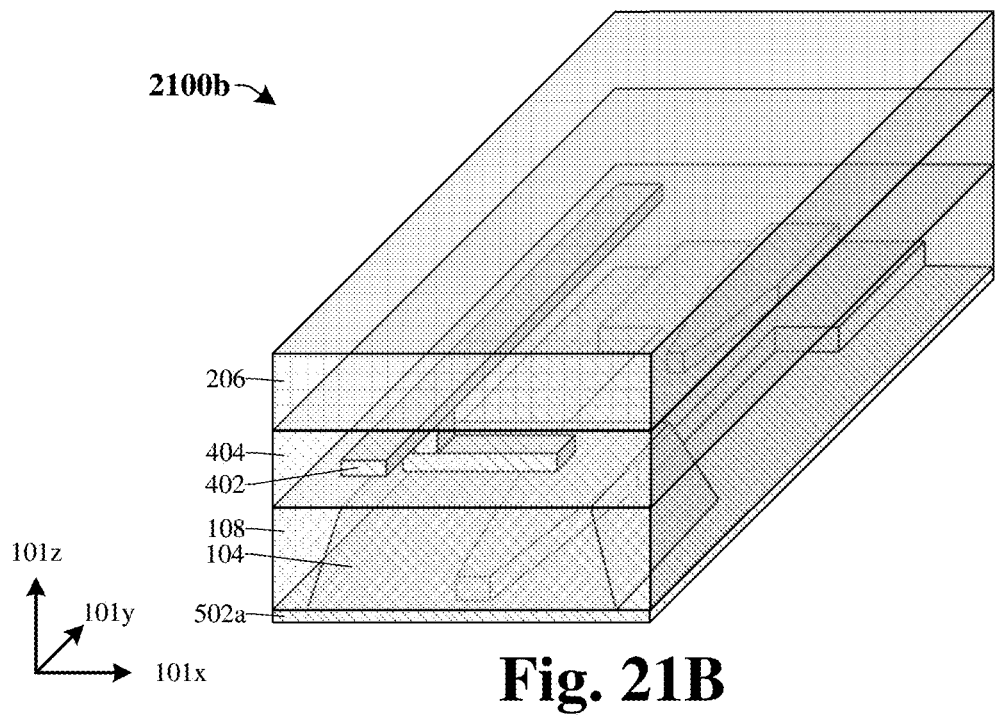

As shown in cross-sectional view 2100a of FIG. 21A and corresponding three-dimensional view 2100b of FIG. 21B, in some embodiments, the buried dielectric layer (e.g., 1104 of FIGS. 20A, 20B) is removed from over the second side 102k of the semiconductor waveguide layer 102 (or from under the semiconductor waveguide layer 102, as shown in FIG. 21B, depending on orientation). In some embodiments, removing the buried dielectric layer comprises performing a grinding process or the like on the buried dielectric layer. In some other embodiments, removing the buried dielectric layer comprises etching the buried dielectric layer.

In some other embodiments, the buried dielectric layer is not removed from over the second side 102k of the semiconductor waveguide layer 102. For example, in some embodiments where the buried dielectric layer is substantially thick (e.g., greater than or approximately equal to the thickness of the first cladding layer 104), the buried dielectric layer is kept over the second side 102k of the semiconductor waveguide layer 102.

Figure 22A:
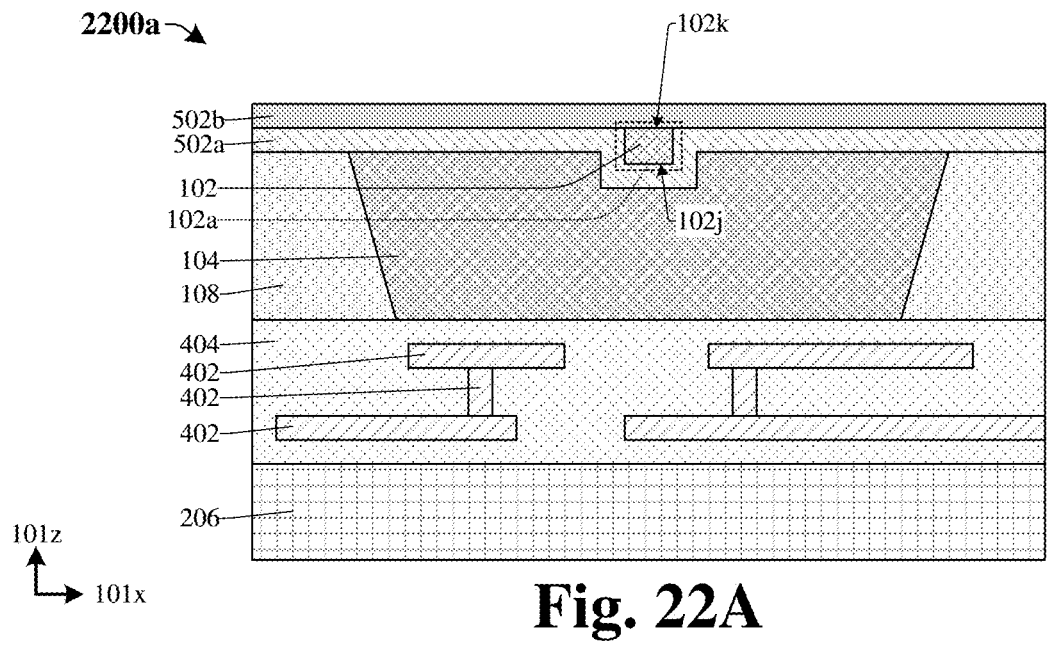
Figure 22B:
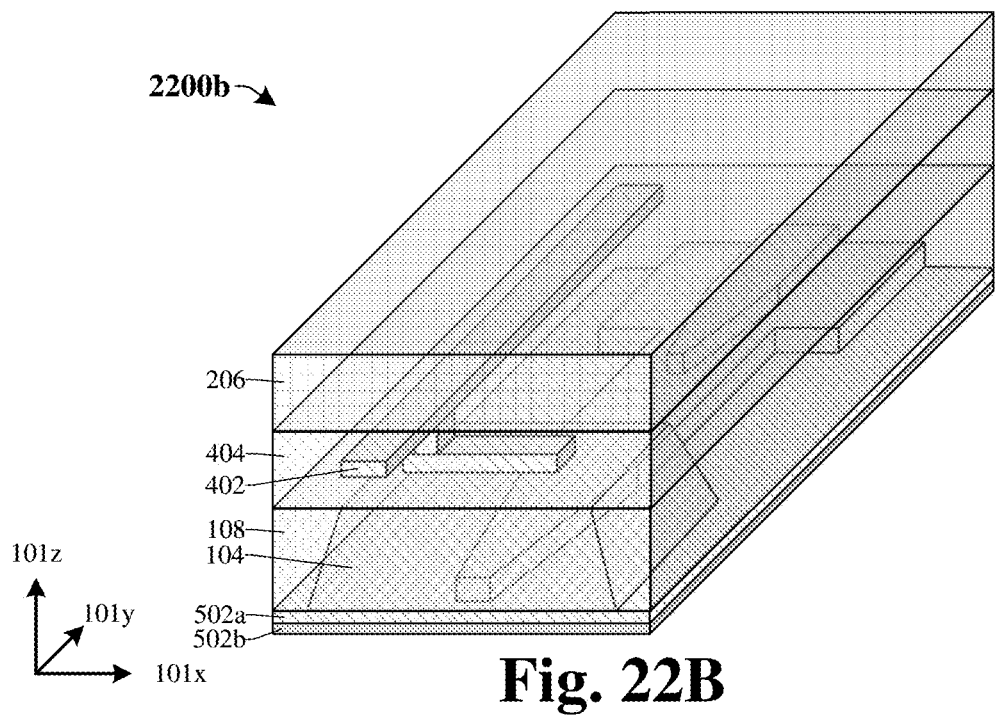

As shown in cross-sectional view 2200a of FIG. 22A and corresponding three-dimensional view 2200b of FIG. 22B, in some embodiments, a second buffer layer 502b is deposited over the second side 102k of the semiconductor waveguide layer 102 and over the first buffer layer 502a. In some embodiments, the second buffer layer 502b is deposited directly on the semiconductor waveguide layer 102 and the first buffer layer 502a. In some other embodiments, the second buffer layer 502b is deposited directly on the semiconductor waveguide layer 102, the first cladding layer 104, and the first dielectric layer 108. In some embodiments, the second buffer layer 502b may, for example, comprise silicon dioxide, silicon oxynitride, or some other suitable material and may be deposited by a CVD process, a PVD process, an ALD process, or some other suitable process. In some embodiments, a thickness of the second buffer layer 502b ranges from about 5 nanometers to 30 nanometers, 10 nanometers to 25 nanometers, or some other suitable range. In some other embodiments, the second buffer layer 502b is not formed over the semiconductor waveguide layer 102 and the method proceeds to FIGS. 23A, 23B or FIGS. 28A, 28B.

FIGS. 23A, 24A, 25A, 26A, 27A illustrate cross-sectional views 2300a, 2400a, 2500a, 2600a, 2700a, and FIGS. 23B, 24B, 25B, 26B, 27B illustrate corresponding three-dimensional views 2300b, 2400b, 2500b, 2600b, 2700b, respectively, of some first embodiments of performing a remainder of the method for forming the semiconductor structure.

Figure 23A:
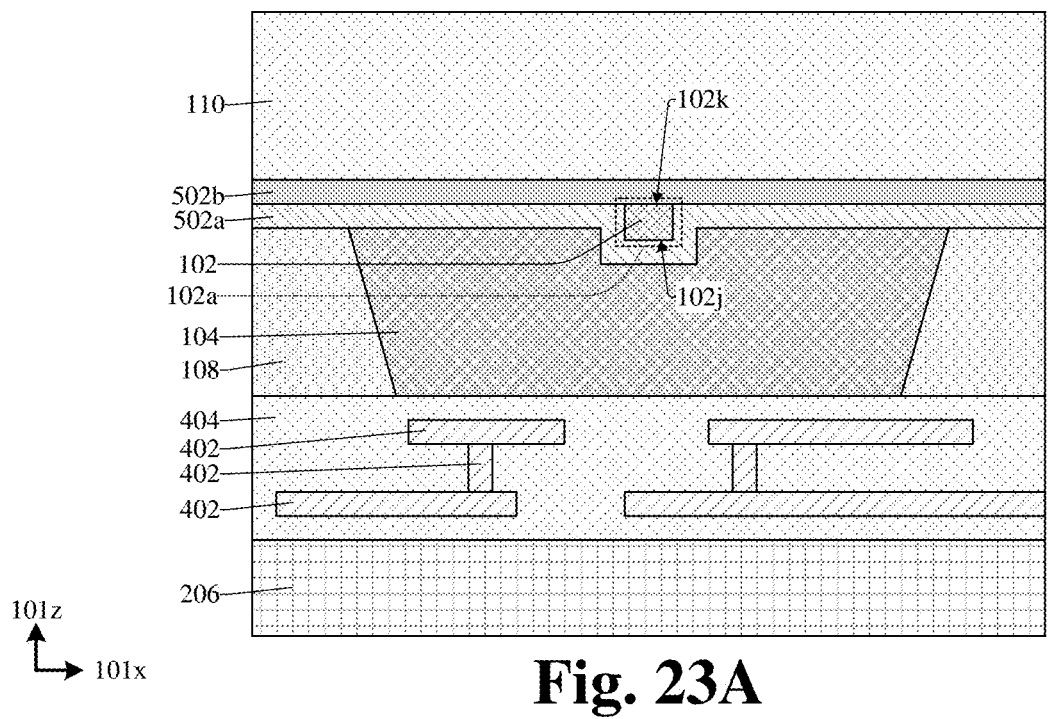
Figure 23B:
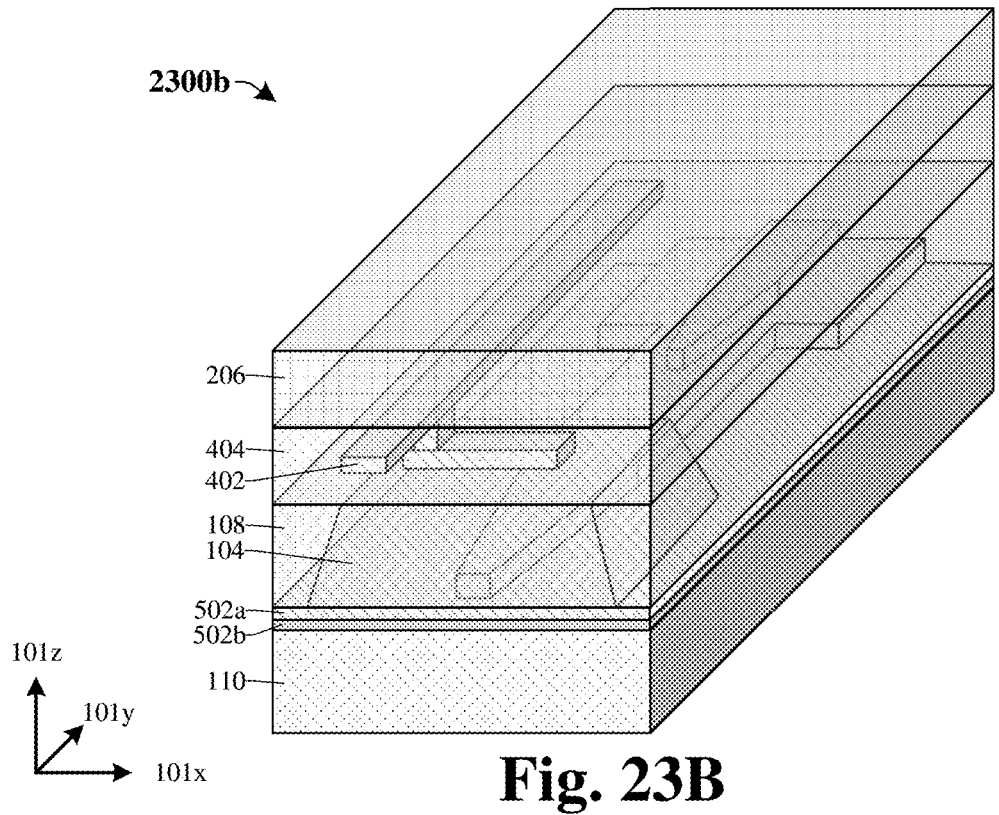

As shown in cross-sectional view 2300a of FIG. 23A and corresponding three-dimensional view 2300b of FIG. 23B, in some embodiments, a second dielectric layer 110 is deposited over the second side 102k of the semiconductor waveguide layer 102 and the second buffer layer 502b. In some embodiments, the second dielectric layer 110 is deposited directly on the second buffer layer 502b. In some other embodiments, the second dielectric layer 110 is deposited directly on the semiconductor waveguide layer 102 and the first buffer layer 502a. In some other embodiments, the second dielectric layer 110 is deposited directly on the semiconductor waveguide layer 102, the first cladding layer 104, and the first dielectric layer 108. In some embodiments, the second dielectric layer 110 may, for example, comprise silicon dioxide or some other suitable material and may be deposited by a CVD process, a PVD process, an ALD process, or some other suitable process.

Figure 24A:
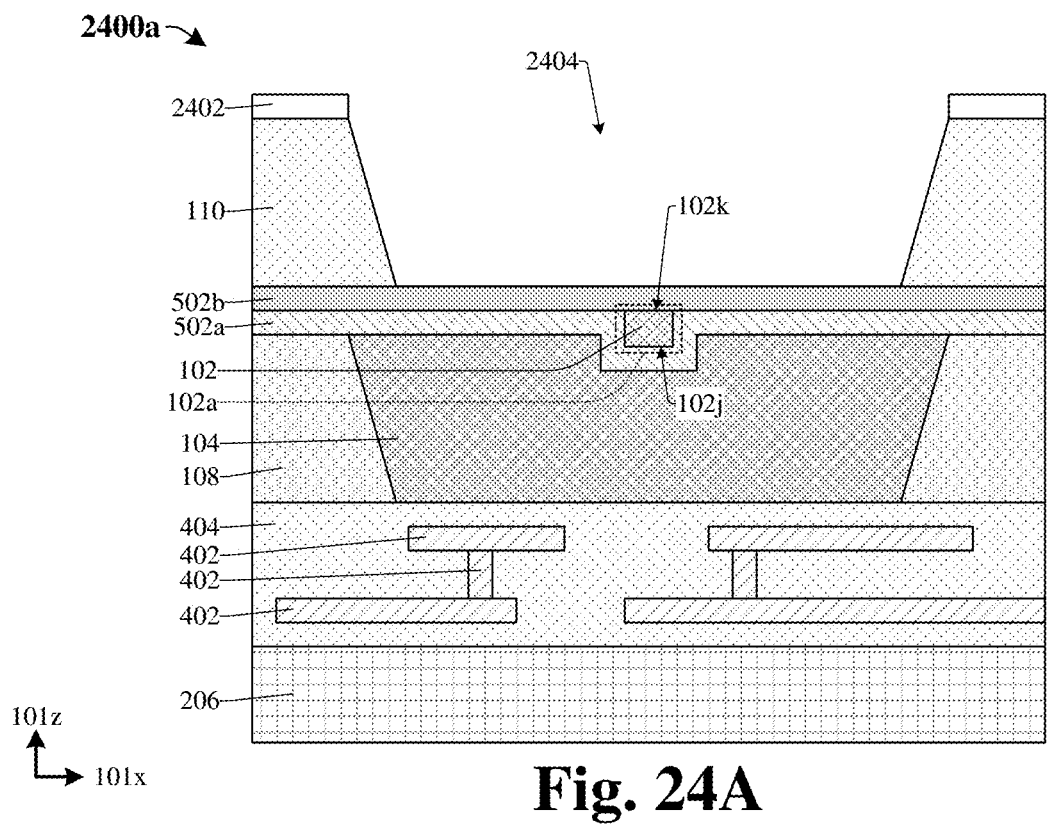
Figure 24B:
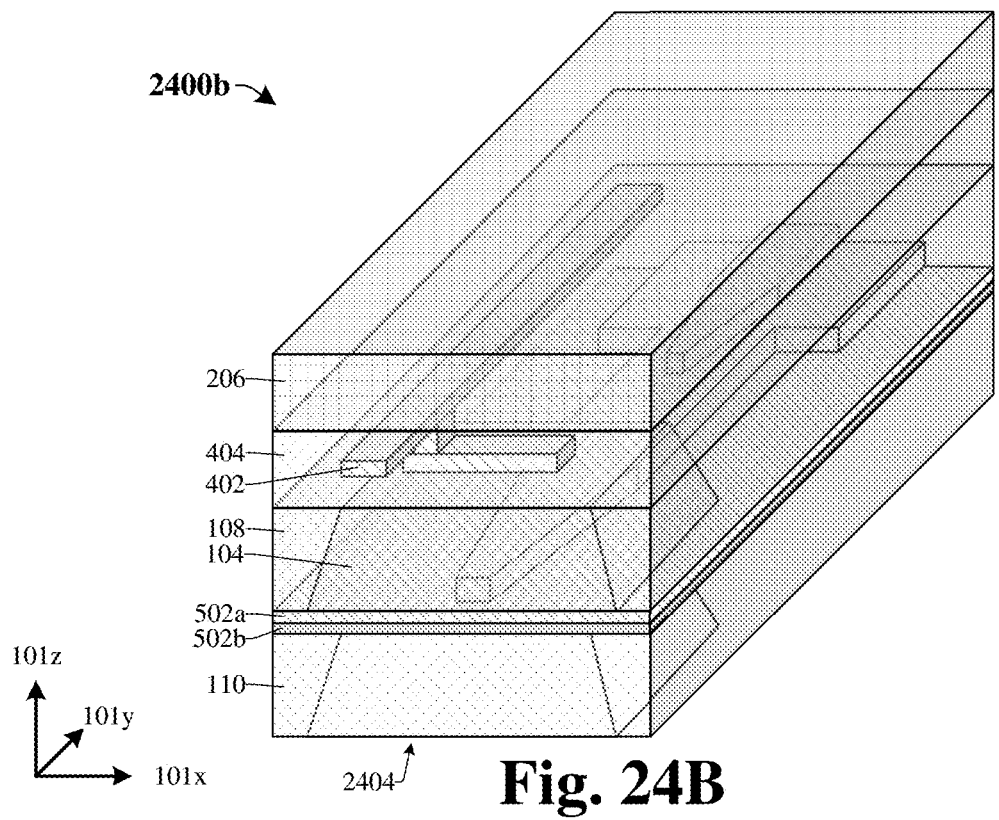

In some embodiments where the buried dielectric layer (e.g., 1104 of FIGS. 20A, 20B) is kept over the second side 102k of the semiconductor waveguide layer 102, the second dielectric layer 110 may not be deposited and the method proceeds to FIGS. 24A, 24B.

As shown in cross-sectional view 2400a of FIG. 24A and corresponding three-dimensional view 2400b of FIG. 24B, the second dielectric layer 110 is etched to form a cavity 2404 in the second dielectric layer 110. In some embodiments, a masking layer 2402 is formed over the second dielectric layer 110 and the second dielectric layer 110 is etched according to the masking layer 2402 to form the cavity 2404. The cavity 2404 is formed directly over the tip 102a and the tapered transition segment (e.g., 102b of FIGS. 1A-1D) but not over other segments (e.g., the slab transition segment 102c, the tapered device segment 102d, and the slab device segment 102e of FIGS. 1A-1D) of the semiconductor waveguide layer 102. In some embodiments, the etching comprises a dry etching process or some other suitable process. In some embodiments, the masking layer 2402 comprises a photoresist layer, a hard mask layer, a combination of the foregoing, or some other suitable masking layer. In some embodiments, the masking layer 2402 is removed after and/or during the etching.

In some embodiments where the buried dielectric layer (e.g., 1104 of FIGS. 20A, 20B) is kept over the second side 102k of the semiconductor waveguide layer 102, the buried dielectric layer is etched (instead of the second dielectric layer 110) to form the cavity 2404 in buried dielectric layer.

Figure 25A:
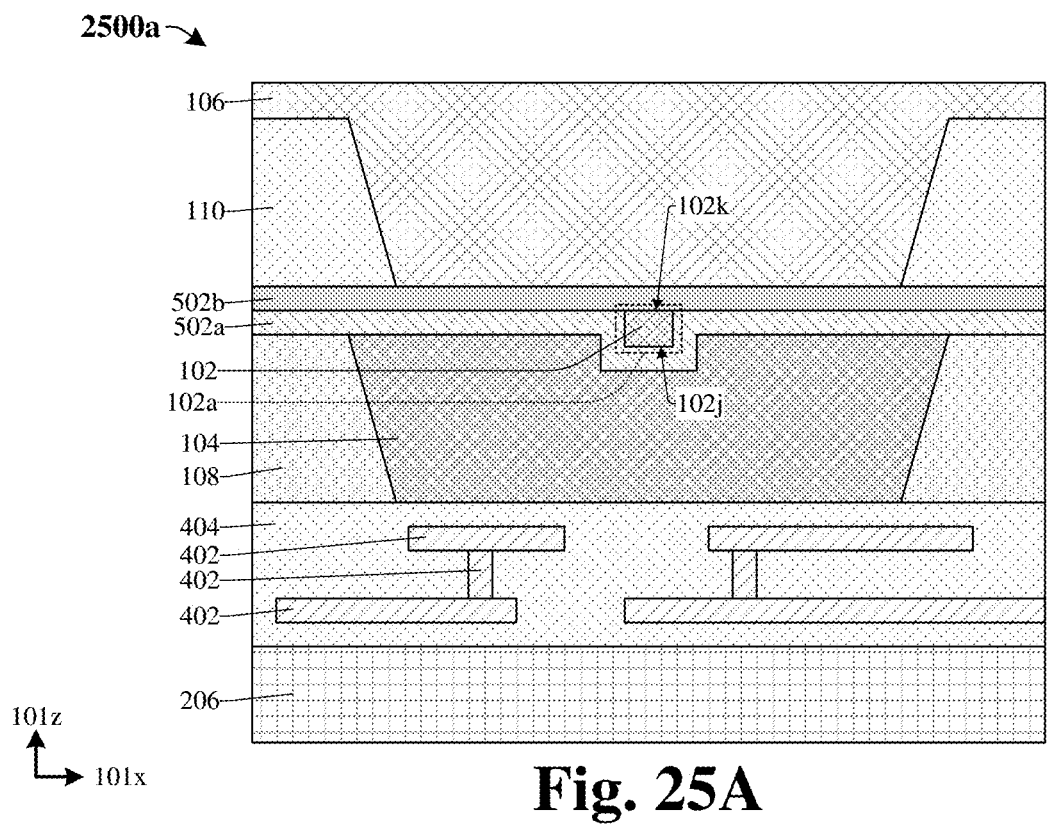
Figure 25B:
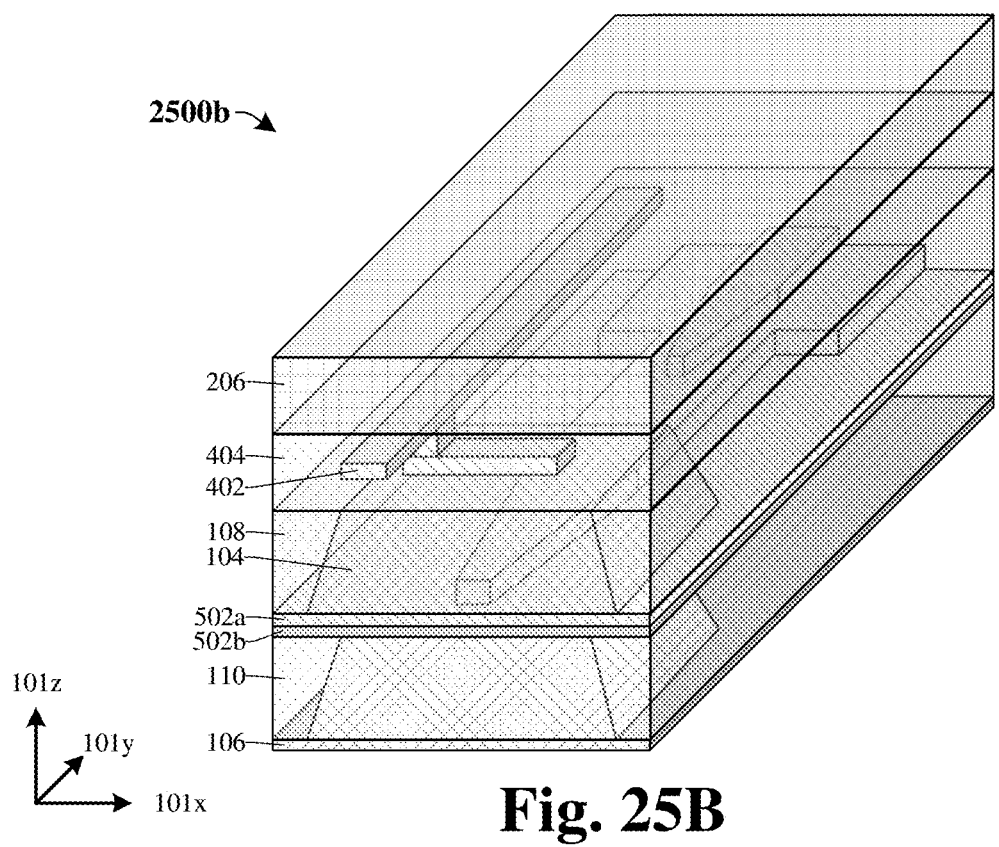

As shown in cross-sectional view 2500a of FIG. 25A and corresponding three-dimensional view 2500b of FIG. 25B, a second cladding layer 106 is deposited over the second dielectric layer 110 and in the cavity (e.g., 2404 of FIGS. 24A, 24B). The second cladding layer 106 fills the cavity in the second dielectric layer 110. In some embodiments, the second cladding layer 106 is deposited directly on the second buffer layer 502b. In some other embodiments, the second cladding layer 106 is deposited directly on the semiconductor waveguide layer 102 and the first buffer layer 502a. In some other embodiments, the second cladding layer 106 is deposited directly on the semiconductor waveguide layer 102 and the first cladding layer 104.

The second cladding layer 106 comprises a dielectric material having a refractive index that is substantially similar to the refractive index of the semiconductor waveguide layer 102. For example, in some embodiments, the second cladding layer 106 comprises silicon nitride, hafnium oxide, or some other suitable material. In some embodiments, the second cladding layer 106 may, for example, be deposited by a CVD process, a PVD process, an ALD process, or some other suitable process. In some embodiments, a thickness of the second cladding layer 106 ranges from about 2 micrometers to 5 micrometers, 3 micrometers to 5 micrometers, or some other suitable range.

In some embodiments where the buried dielectric layer (e.g., 1104 of FIGS. 20A, 20B) is kept over the second side 102k of the semiconductor waveguide layer 102, the second cladding layer 106 is deposited over the buried dielectric layer and in the cavity in the buried dielectric layer.

Figure 26A:
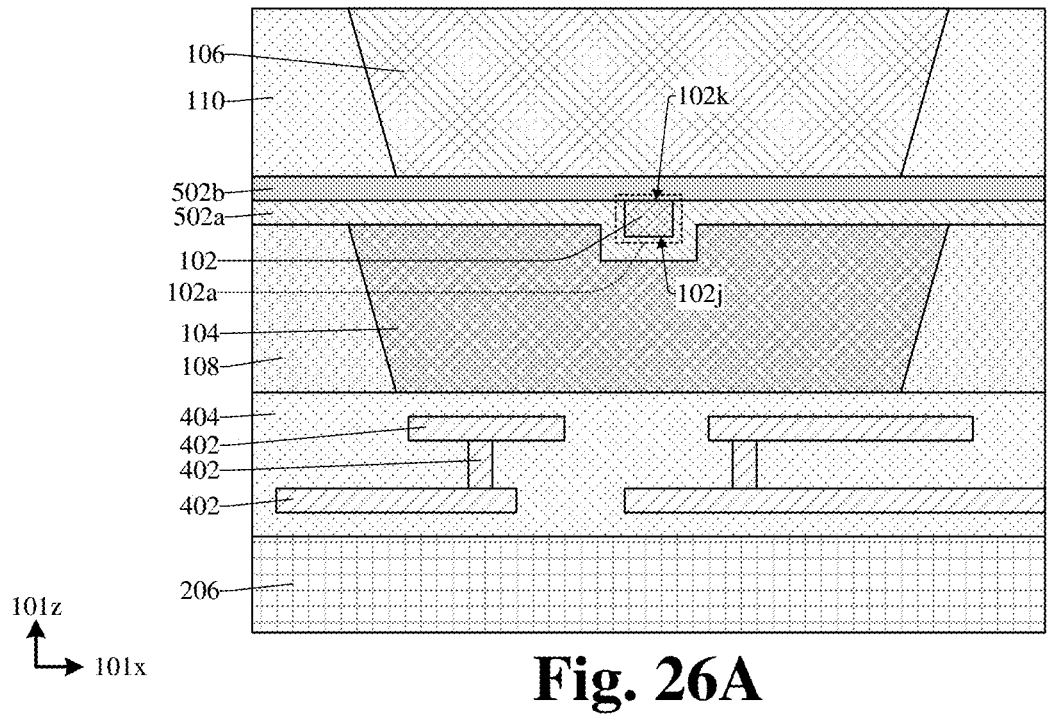
Figure 26B:
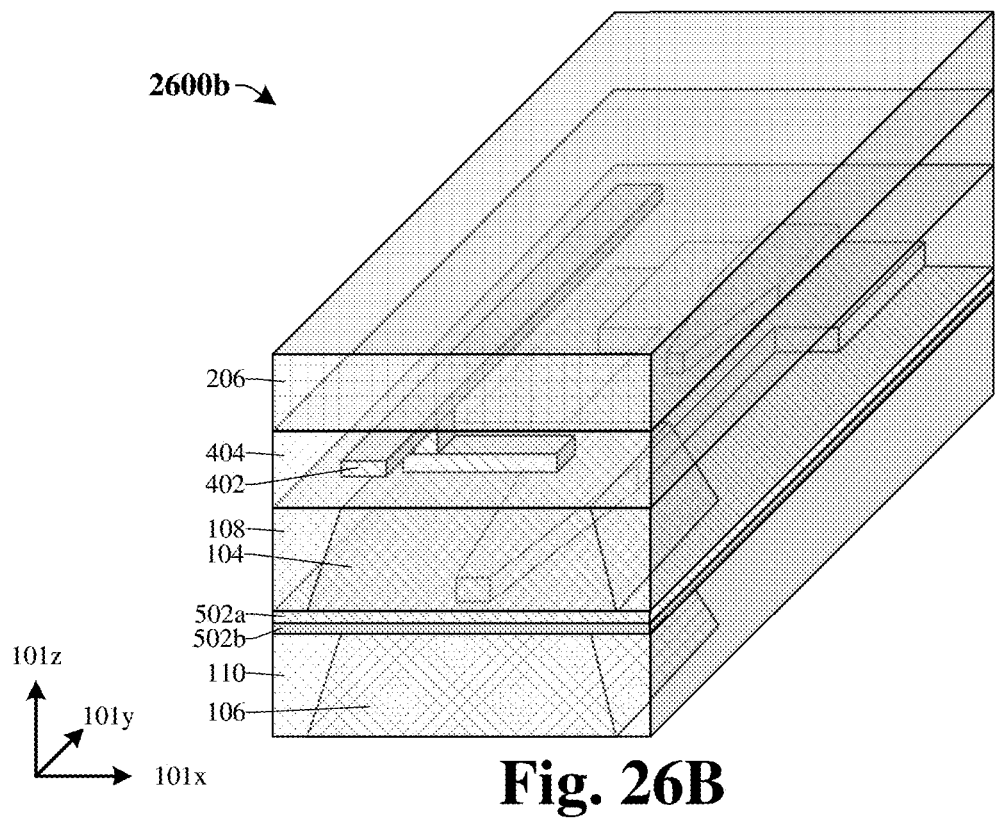

As shown in cross-sectional view 2600a of FIG. 26A and corresponding three-dimensional view 2600b of FIG. 26B, a planarization process is performed on the second cladding layer 106. In some embodiments, the planarization process comprises a CMP or some other suitable process. In some embodiments, the planarization process is also performed on the second dielectric layer 110 or the buried dielectric layer. In some embodiments, a top surface of the second cladding layer 106 and a top surface of the second dielectric layer 110 are approximately coplanar as a result of the planarization process.

Figure 27A:
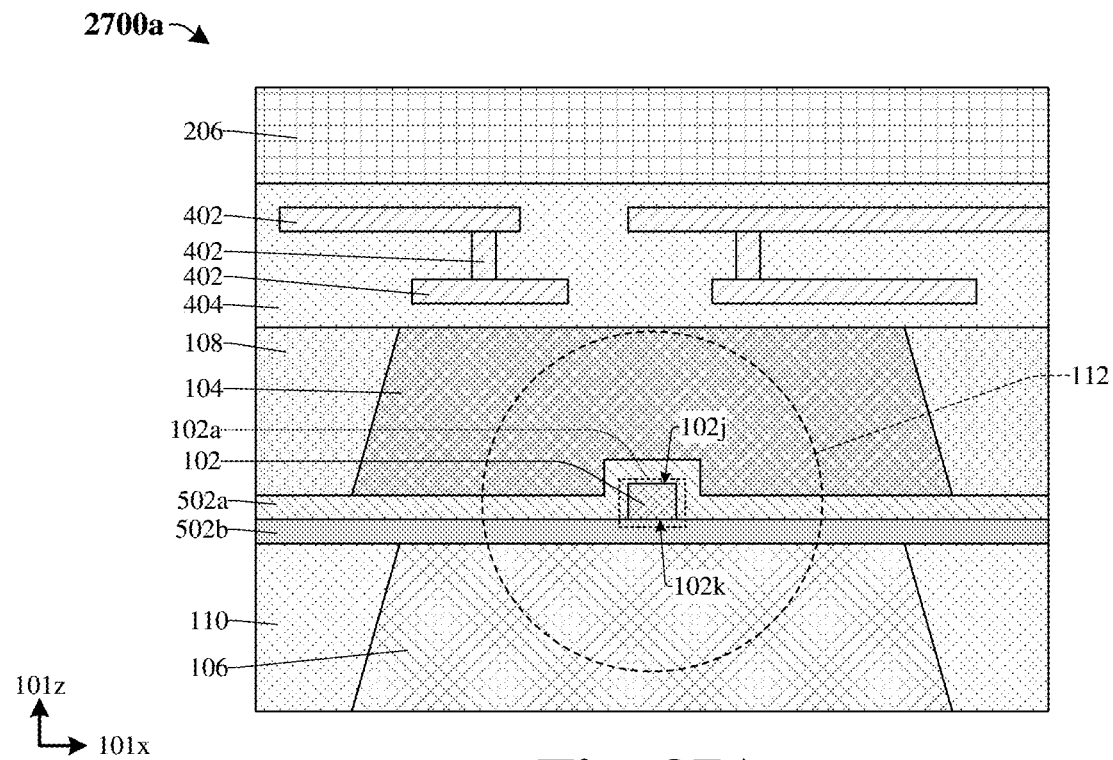
Figure 27B:
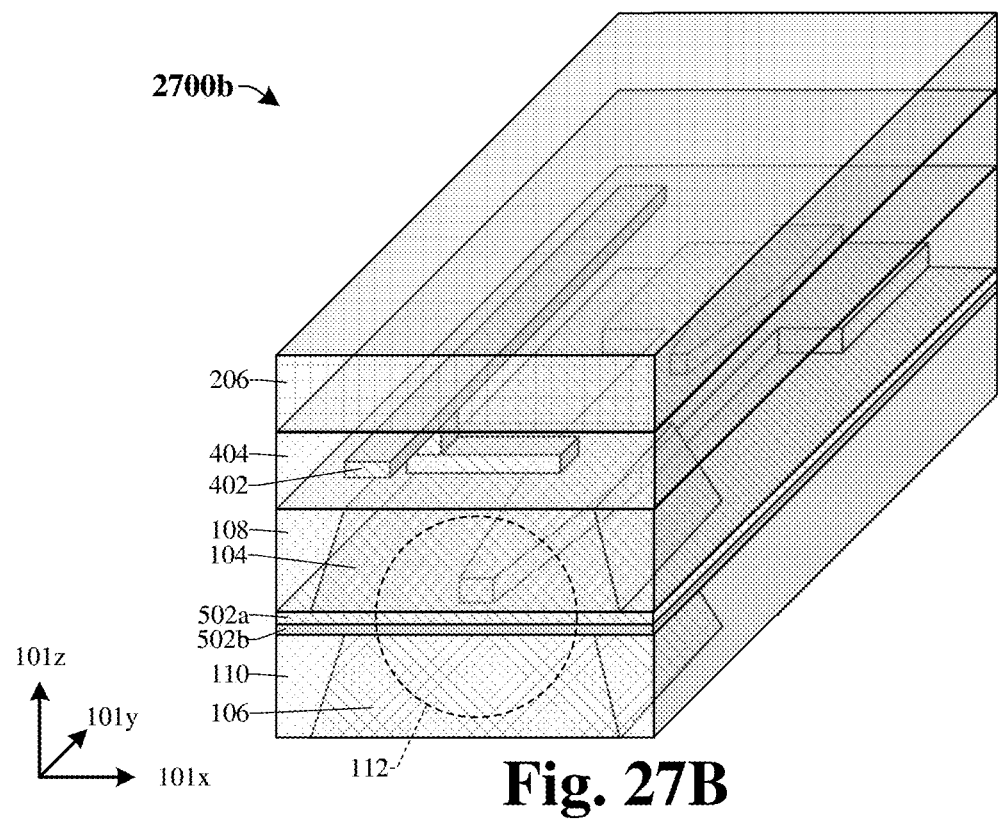

As shown in cross-sectional view 2700a of FIG. 27A and corresponding three-dimensional view 2700b of FIG. 27B, an optical fiber 112 is optically coupled to the semiconductor waveguide layer 102. In some embodiments, a diameter of the optical fiber 112 (e.g., the diameter of the core of the optical fiber 112) ranges from about 8 micrometers to 10 micrometers or some other suitable range.

FIGS. 28A, 29A, 30A, 31A, 32A illustrate cross-sectional views 2800a, 2900a, 3000a, 3100a, 3200a, and FIGS. 28B, 29B, 30B, 31B, 32B illustrate corresponding three-dimensional views 2800b, 2900b, 3000b, 3100b, 3200b, respectively, of some second embodiments of performing a remainder of the method for forming the semiconductor structure.

Figure 28A:
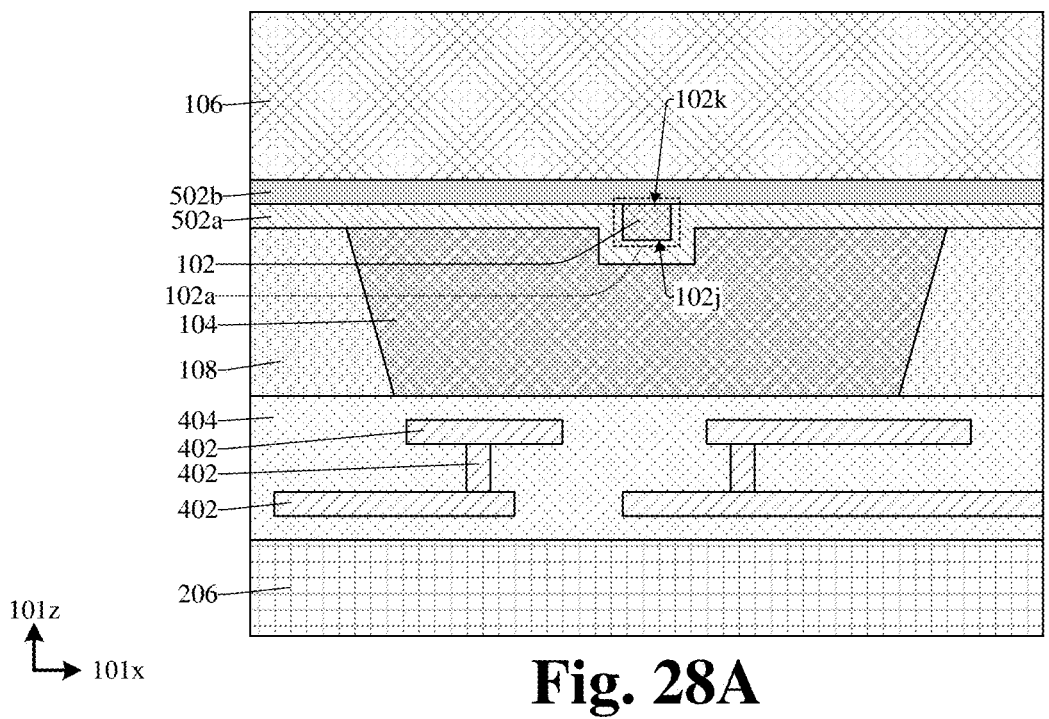
Figure 28B:
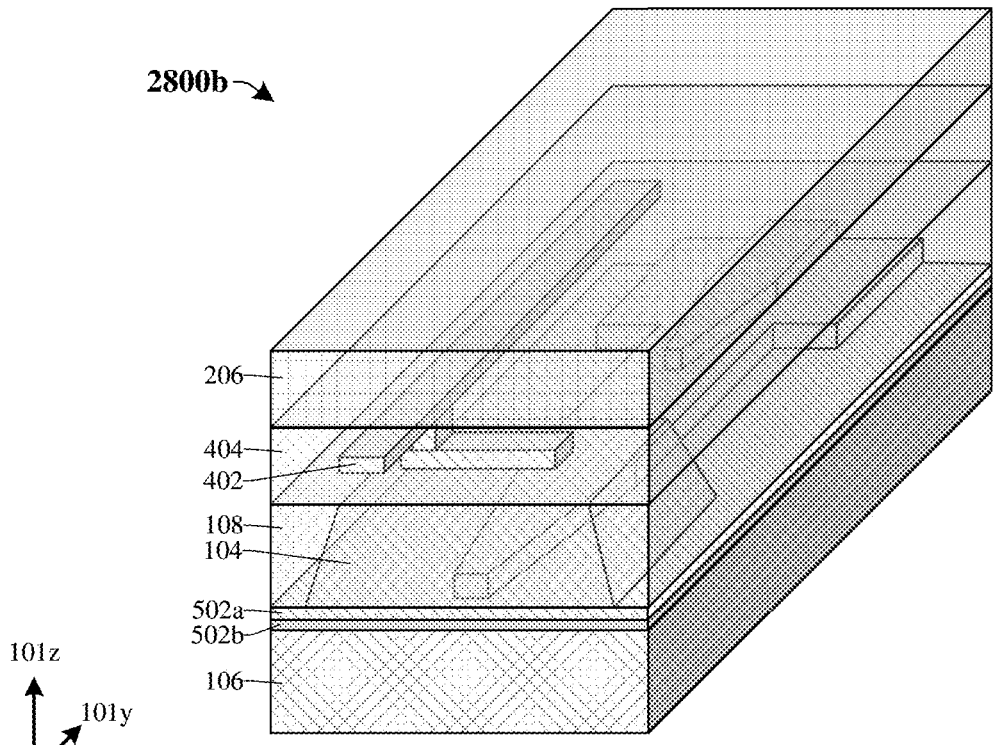

As shown in cross-sectional view 2800a of FIG. 28A and corresponding three-dimensional view 2800b of FIG. 28B, the second cladding layer 106 is deposited over the second side 102k of the semiconductor waveguide layer 102 and over the second buffer layer 502b. In some embodiments, the second cladding layer 106 is deposited directly on the second buffer layer 502b. In some other embodiments, the second cladding layer 106 is deposited directly on the semiconductor waveguide layer 102 and the first buffer layer 502a. In some other embodiments, the second cladding layer 106 is deposited directly on the semiconductor waveguide layer 102, the first cladding layer 104, and the first dielectric layer 108.

Figure 29A:
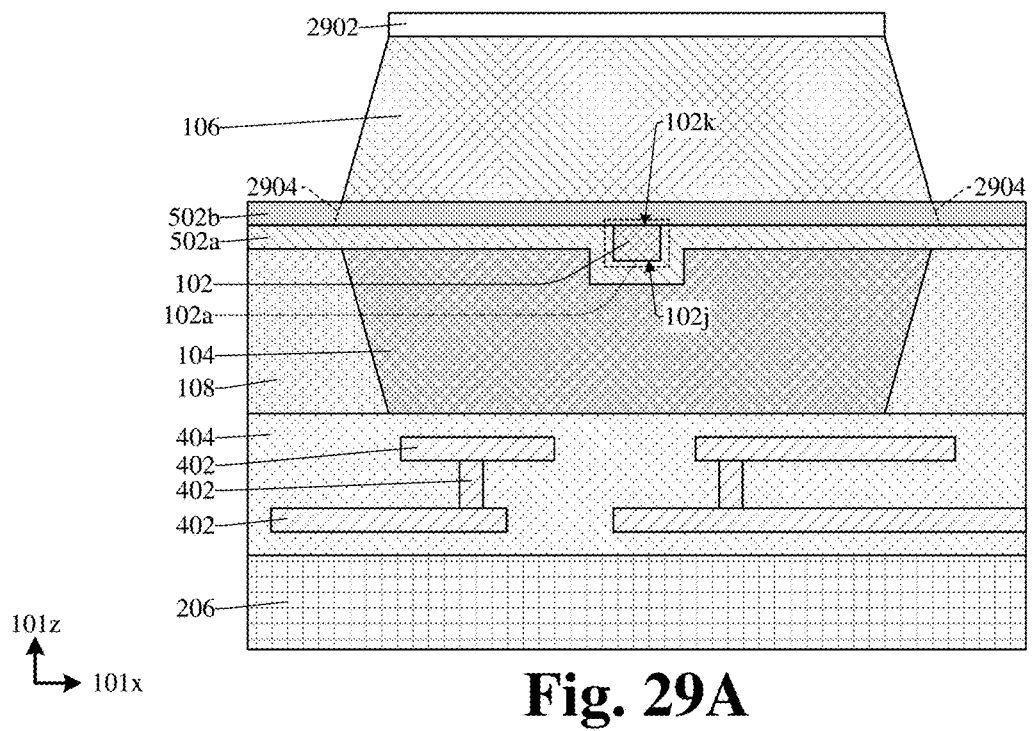
Figure 29B:
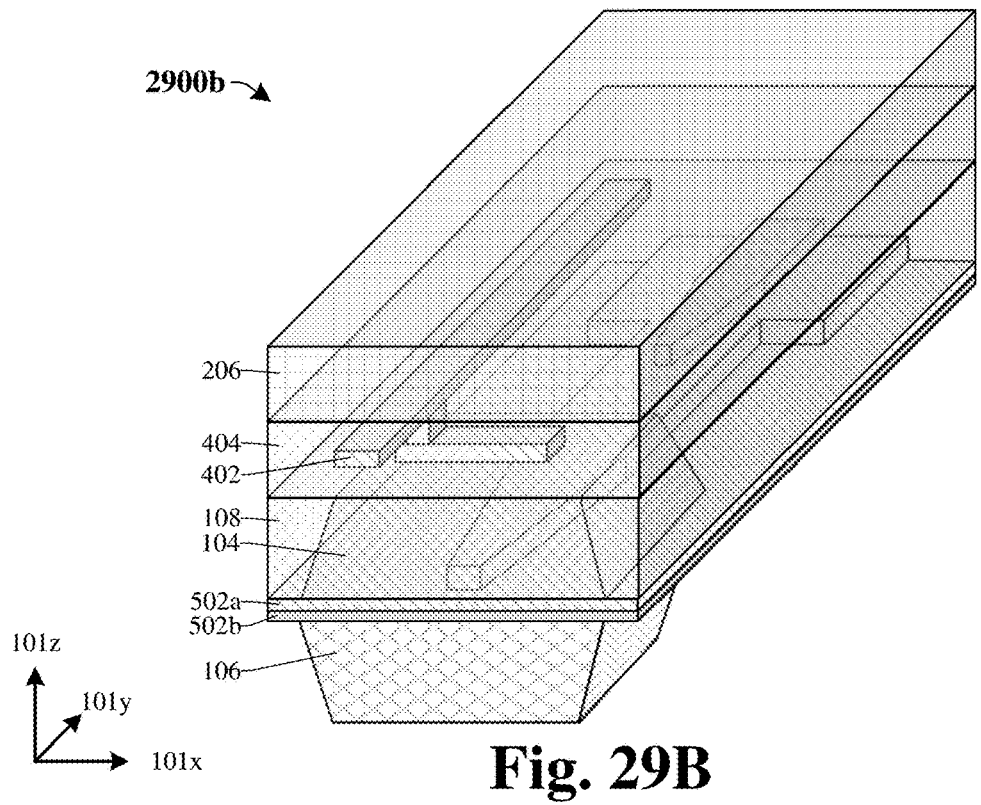

As shown in cross-sectional view 2900a of FIG. 29A and corresponding three-dimensional view 2900b of FIG. 29B, the second cladding layer is patterned to remove the second cladding layer 106 from over segments of the semiconductor waveguide layer 102 (e.g., the slab transition segment 102c, the tapered device segment 102d, and the slab device segment 102e of FIGS. 1A-1D) not including the tip 102a and the tapered transition segment (e.g., 102b of FIGS. 1A-1D). Thus, after the patterning, the tip 102a and the tapered transition segment are covered by the second cladding layer 106 while the other segments of the semiconductor waveguide layer 102 are not covered by the second cladding layer 106. In some embodiments, the patterning comprises forming a masking layer 2902 over the second cladding layer 106 and etching the second cladding layer 106 according to the masking layer 2902. In some embodiments, the etching comprises a dry etching process or some other suitable process. In some embodiments, the masking layer 2902 comprises a photoresist layer, a hard mask layer, a combination of the foregoing, or some other suitable masking layer. In some embodiments, the masking layer 2902 is removed after and/or during the etching.

In some embodiments, the second buffer layer 502b is also etched according to the masking layer 2902 to remove the second buffer layer 502b from over segments of the semiconductor waveguide layer 102 (e.g., the slab transition segment 102c, the tapered device segment 102d, and the slab device segment 102e of FIGS. 1A-1D) not including the tip 102a and the tapered transition segment (e.g., 102b of FIGS. 1A-1D). In some such embodiments, sidewalls of the second buffer layer 502b are approximately aligned with sidewalls of the second cladding layer 106 as illustrated, for example, by dashed lines 2904 and as shown in FIGS. 7A, 7B.

Figure 30A:
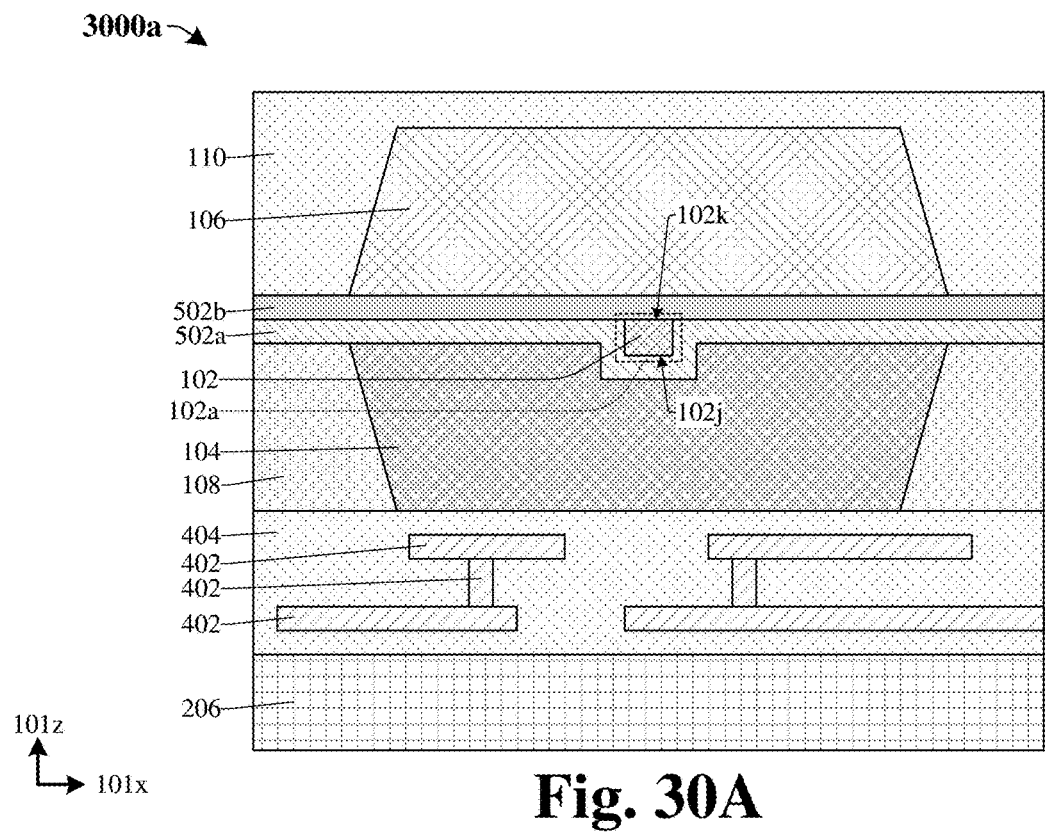
Figure 30B:
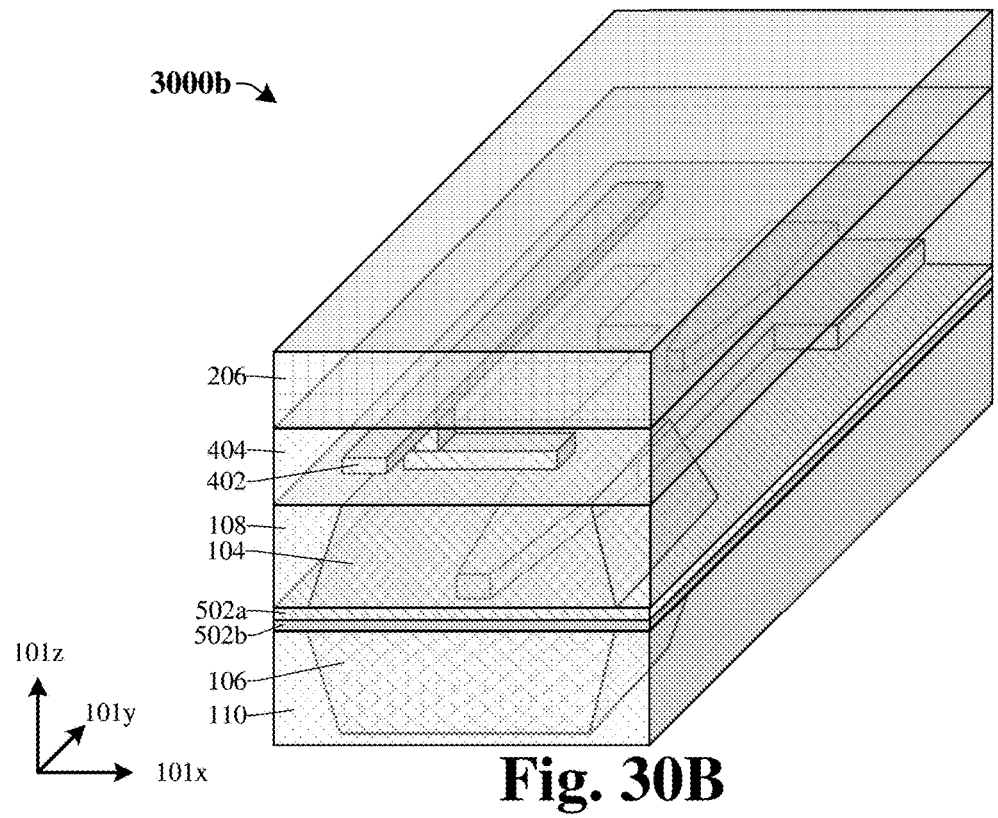

As shown in cross-sectional view 3000a of FIG. 30A and corresponding three-dimensional view 3000b of FIG. 30B, the second dielectric layer 110 is deposited over the second cladding layer 106 and over the second buffer layer 502b. In some embodiments, the second dielectric layer 110 is deposited directly on the second cladding layer 106 and the second buffer layer 502b. In some other embodiments, the second dielectric layer 110 is deposited directly on the second cladding layer 106 and the first buffer layer 502a. In some other embodiments, the second dielectric layer 110 is deposited directly on the second cladding layer 106 and the first dielectric layer 108.

Figure 31A:
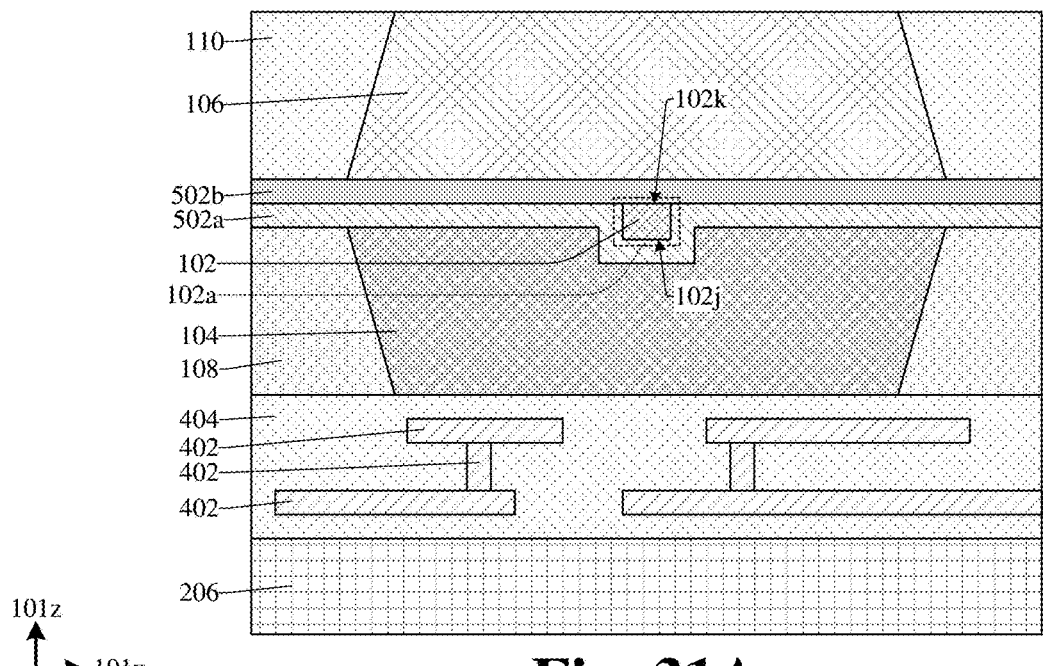
Figure 31B:
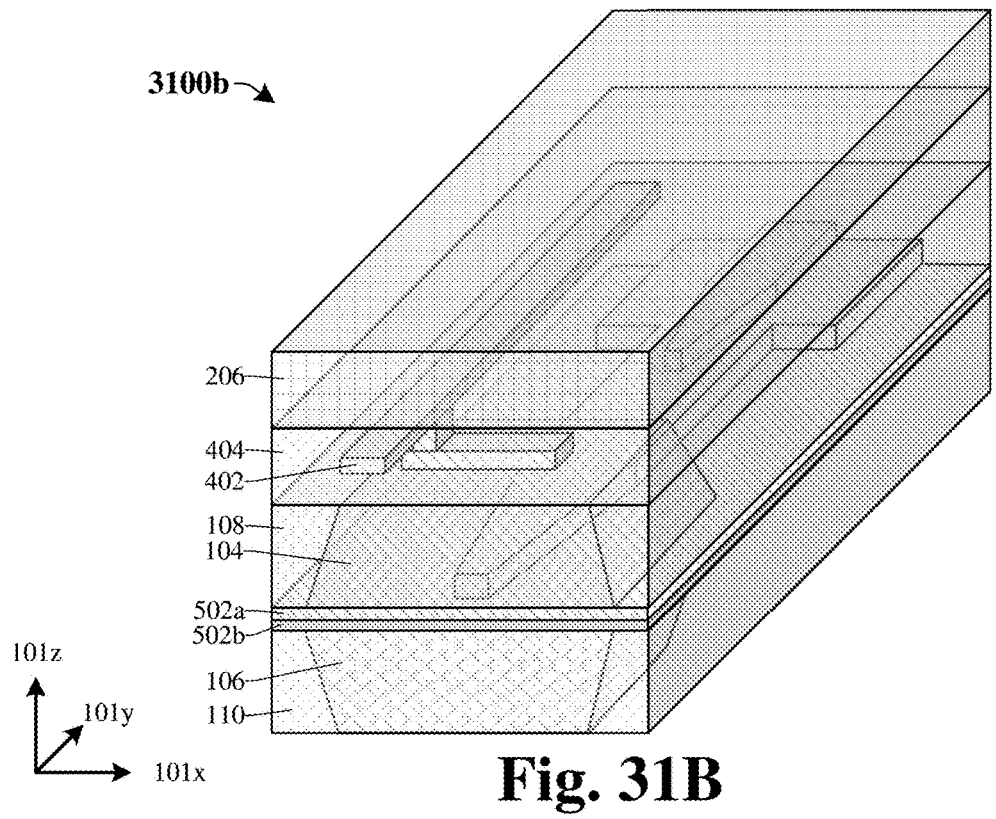

As shown in cross-sectional view 3100a of FIG. 31A and corresponding three-dimensional view 3100b of FIG. 31B, a planarization process is performed on the second dielectric layer 110. In some embodiments, the planarization process comprises a CMP or some other suitable process. In some embodiments, the planarization process is also performed on the second cladding layer 106. In some embodiments, a top surface of the second dielectric layer 110 and a top surface of the second cladding layer 106 are approximately coplanar as a result of the planarization process.

Figure 32A:
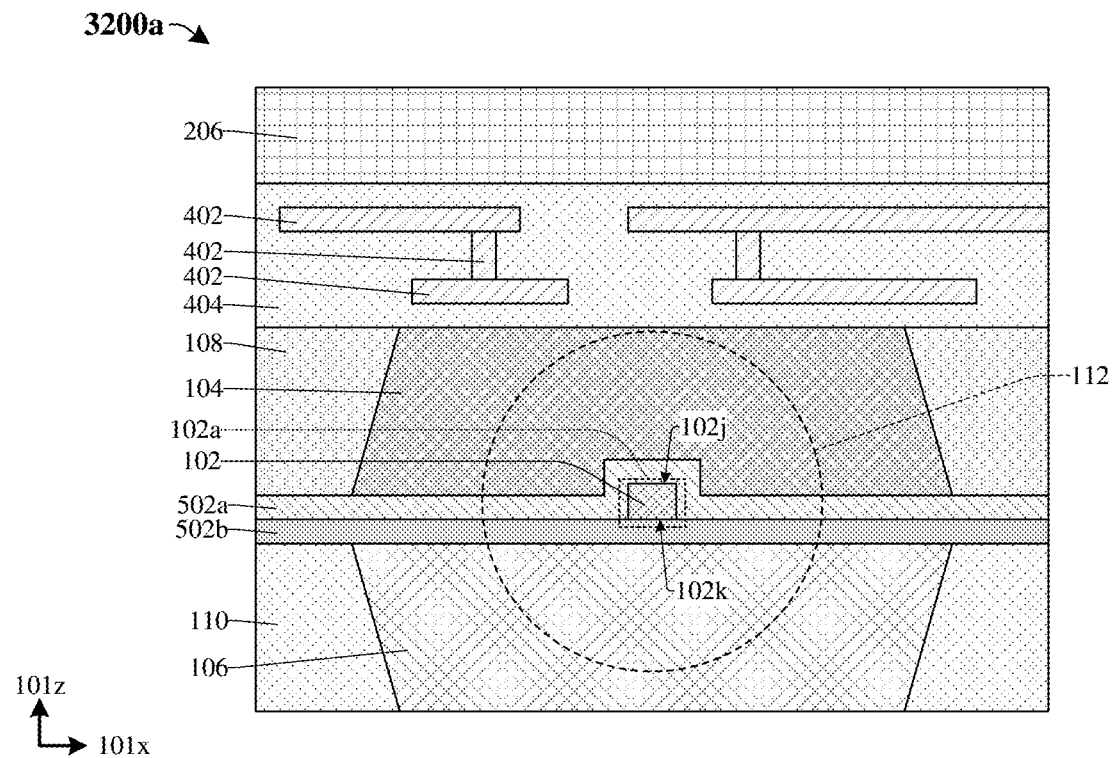
Figure 32B:
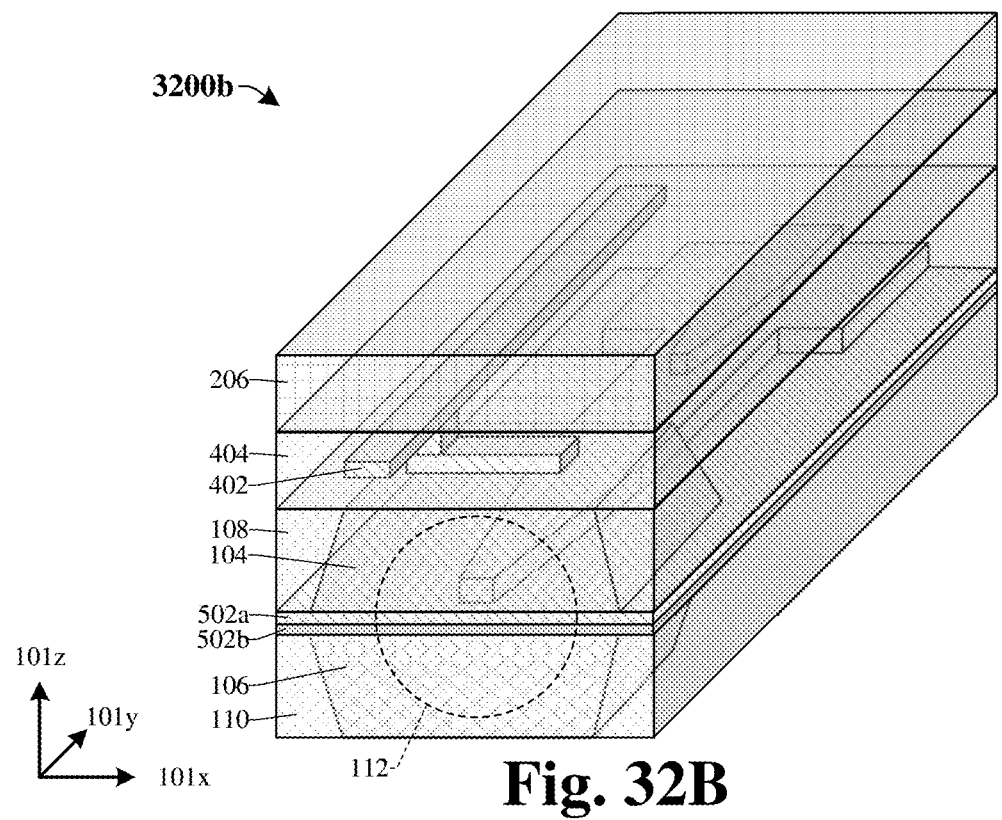

As shown in cross-sectional view 3200a of FIG. 32A and corresponding three-dimensional view 3200b of FIG. 32B, an optical fiber 112 is optically coupled to the semiconductor waveguide layer 102.

Figure 33:
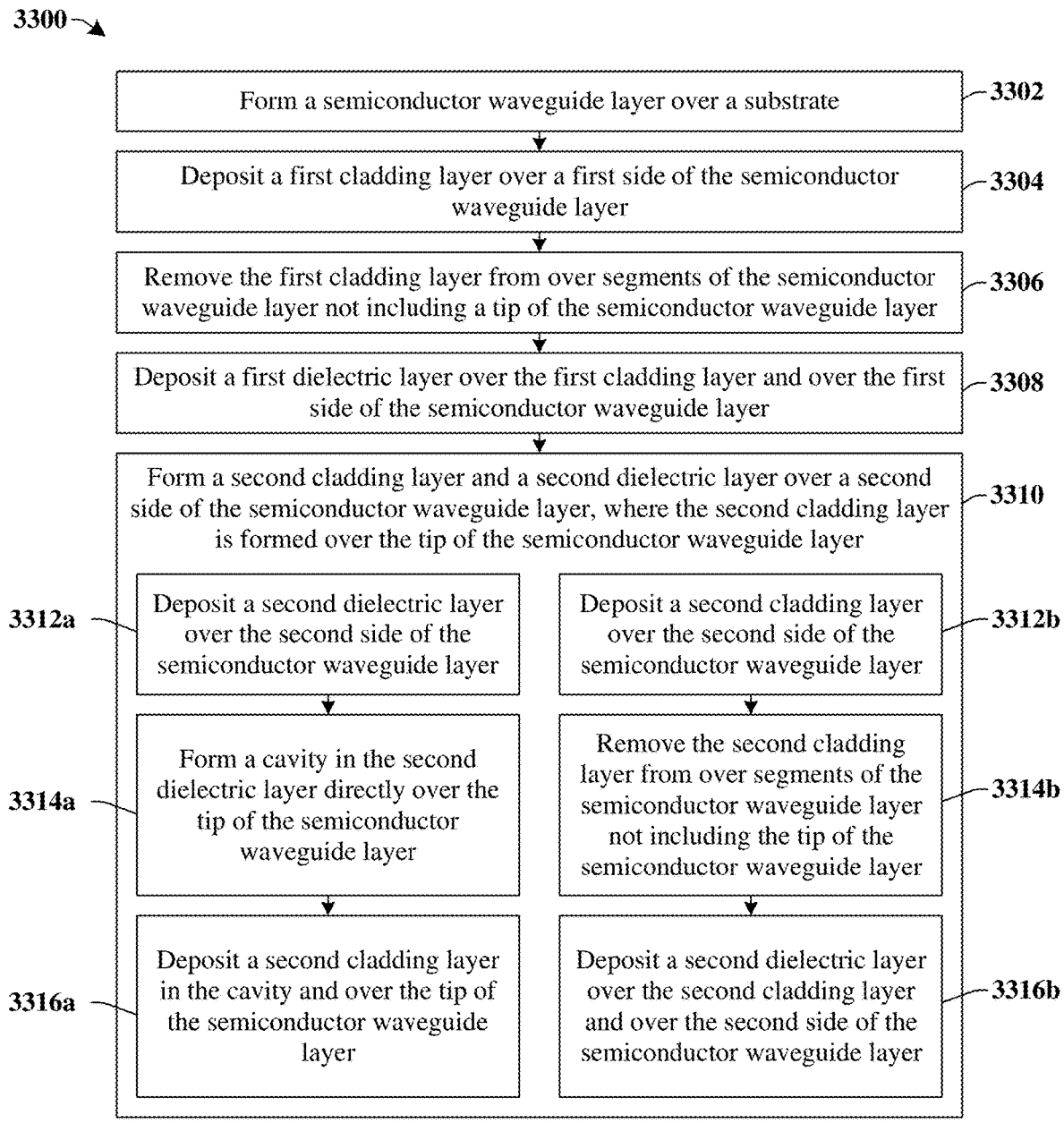
FIG. 33 illustrates a flow diagram of some embodiments of a method for forming a semiconductor structure comprising a semiconductor waveguide layer, a first cladding layer along a first side of the semiconductor waveguide layer, and a second cladding layer along a second side of the semiconductor waveguide layer.

FIG. 33 illustrates a flow diagram of some embodiments of a method 3300 for forming a semiconductor structure comprising a semiconductor waveguide layer, a first cladding layer along a first side of the semiconductor waveguide layer, and a second cladding layer along a second side of the semiconductor waveguide layer. While method 3300 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

At block 3302, form a semiconductor waveguide layer over a substrate. FIG. 12A illustrates a cross-sectional view 1200a of some embodiments corresponding to block 3302.

At block 3304, deposit a first cladding layer over a first side of the semiconductor waveguide layer. FIG. 14A illustrates a cross-sectional view 1400a of some embodiments corresponding to block 3304.

At block 3306, remove the first cladding layer from over segments of the semiconductor waveguide layer not including a tip of the semiconductor waveguide layer. FIG. 15A illustrates a cross-sectional view 1500a of some embodiments corresponding to block 3306.

At block 3308, deposit a first dielectric layer over the first cladding layer and over the first side of the semiconductor waveguide layer. FIG. 16A illustrates a cross-sectional view 1600a of some embodiments corresponding to block 3308.

At block 3310, form a second cladding layer and a second dielectric layer over a second side of the semiconductor waveguide layer, where the second cladding layer is formed over the tip of the semiconductor waveguide layer. FIGS. 23A, 24A, 25A illustrate cross-sectional views 2300a, 2400a, 2500a, respectively, of some embodiments corresponding to block 3310. FIGS. 28A, 29A, 30A illustrate cross-sectional views 2800a, 2900a, 3000a, respectively, of some other embodiments corresponding to block 3310. In some embodiments, block 3310 includes blocks 3312a, 3314a, 3316a. In some other embodiments, block 3310 includes blocks 3312b, 3314b, 3316b.

At block 3312a, deposit a second dielectric layer over the second side of the semiconductor waveguide layer. FIG. 23A illustrates a cross-sectional view 2300a of some embodiments corresponding to block 3312a.

At block 3314a, form a cavity in the second dielectric layer directly over the tip of the semiconductor waveguide layer. FIG. 24A illustrates a cross-sectional view 2400a of some embodiments corresponding to block 3314a.

At block 3316a, deposit a second cladding layer in the cavity and over the tip of the semiconductor waveguide layer. FIG. 25A illustrates a cross-sectional view 2500a of some embodiments corresponding to block 3316a.

At block 3312b, deposit a second cladding layer over the second side of the semiconductor waveguide layer. FIG. 28A illustrates a cross-sectional view 2800a of some embodiments corresponding to block 3312b.

At block 3314b, remove the second cladding layer from over segments of the semiconductor waveguide layer not including the tip of the semiconductor waveguide layer. FIG. 29A illustrates a cross-sectional view 2900a of some embodiments corresponding to block 3314b.

At block 3316b, deposit a second dielectric layer over the second cladding layer and over the second side of the semiconductor waveguide layer. FIG. 30A illustrates a cross-sectional view 3000a of some embodiments corresponding to block 3316b.

Thus, the present disclosure relates to a semiconductor structure comprising a semiconductor waveguide layer which tapers to a tip, where the tip is surrounded by a first cladding layer and a second cladding layer to improve a performance of the semiconductor structure.

Accordingly, in some embodiments, the present disclosure relates to a semiconductor structure including a first dielectric layer and a second dielectric layer under the first dielectric layer. A semiconductor waveguide layer is over the second dielectric layer and between first sidewalls of the first dielectric layer. A first cladding layer is between the first sidewalls of the first dielectric layer and directly over the semiconductor waveguide layer. A second cladding layer is between first sidewalls of the second dielectric layer and directly under the semiconductor waveguide layer. A difference between a refractive index of the semiconductor waveguide layer and a refractive index of the first cladding layer is less than a difference between the refractive index of the semiconductor waveguide layer and a refractive index of the first dielectric layer. A difference between the refractive index of the semiconductor waveguide layer and a refractive index of the second cladding layer is less than a difference between the refractive index of the semiconductor waveguide layer and a refractive index of the second dielectric layer.

In other embodiments, the present disclosure relates to a semiconductor structure including a first dielectric layer, a second dielectric layer, a semiconductor waveguide layer, a first cladding layer, and a second cladding layer. The first dielectric layer includes a first dielectric having a first refractive index. The second dielectric layer is under the first dielectric layer and includes a second dielectric having a second refractive index. The semiconductor waveguide layer is over the second dielectric layer and between sidewalls of the first dielectric layer. The semiconductor waveguide layer includes a first segment and a second segment. A width of the first segment is tapered along a length of the first segment to a tip. The semiconductor waveguide layer has a third refractive index. A first cladding layer is between the sidewalls of the first dielectric layer, on opposite sides of the first segment and the tip, and directly over the first segment and the tip. The first cladding layer includes a third dielectric having a fourth refractive index. The second cladding layer is between sidewalls of the second dielectric layer and directly under the first segment and the tip. The second cladding layer includes the third dielectric having the fourth refractive index. A difference between the third refractive index and the fourth refractive index is less than a difference between the third refractive index and the first refractive index and less than a difference between the third refractive index and the second refractive index.

In yet other embodiments, the present disclosure relates to a method for forming a semiconductor structure. The method includes depositing a first cladding layer over a first side of a semiconductor waveguide layer. The semiconductor waveguide layer includes a tapered segment between a device segment and a tip of the semiconductor waveguide layer. The first cladding layer is etched to remove the first cladding layer from over the device segment. The first cladding layer remains over the tip and the tapered segment after the etching. A first dielectric layer is deposited over the first cladding layer and over the first side of the semiconductor waveguide layer. A second dielectric layer is deposited over a second side of the semiconductor waveguide layer, opposite the first side. A second cladding layer is formed over the second side of the semiconductor waveguide layer and directly over the first cladding layer, the tip, and the tapered segment. A difference between a refractive index of the semiconductor waveguide layer and a refractive index of the first cladding layer is less than a difference between the refractive index of the semiconductor waveguide layer and a refractive index of the first dielectric layer. A difference between the refractive index of the semiconductor waveguide layer and a refractive index of the second cladding layer is less than a difference between the refractive index of the semiconductor waveguide layer and a refractive index of the second dielectric layer.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for forming a semiconductor structure, the method comprising:
    depositing a first cladding layer along a first side of a semiconductor waveguide layer and over a device segment, a tapered segment, and a tip of the semiconductor waveguide layer, wherein tapered segment is between the device segment and the tip of the semiconductor waveguide layer;
    etching the first cladding layer to remove the first cladding layer from over the device segment, wherein the first cladding layer remains over the tip and the tapered segment after the etching of the first cladding layer;
    depositing a first dielectric layer over the first cladding layer and along the first side of the semiconductor waveguide layer;
    depositing a second dielectric layer along a second side of the semiconductor waveguide layer, opposite the first side, and over the device segment, the tapered segment, the first cladding layer, and the first dielectric layer; and
    depositing a second cladding layer along the second side of the semiconductor waveguide layer, beside the second dielectric layer, and over the first cladding layer, the tip, and the tapered segment,
    wherein a difference between a refractive index of the semiconductor waveguide layer and a refractive index of the first cladding layer is less than a difference between the refractive index of the semiconductor waveguide layer and a refractive index of the first dielectric layer.

2. The method of claim 1, wherein the second dielectric layer is deposited over the tip, the method further comprising:
    etching the second dielectric layer to form a cavity in the second dielectric layer directly over the tip and the tapered segment, wherein the second cladding layer is deposited in the cavity,
    wherein a difference between the refractive index of the semiconductor waveguide layer and a refractive index of the second cladding layer is less than a difference between the refractive index of the semiconductor waveguide layer and a refractive index of the second dielectric layer.

3. The method of claim 1, further comprising:
depositing a first buffer layer over the first side of the semiconductor waveguide layer before the first cladding layer is deposited over the first side of the semiconductor waveguide layer, wherein the first cladding layer is deposited over the first buffer layer.

4. The method of claim 1, further comprising:
removing a semiconductor substrate layer and a buried dielectric layer from a second side of the semiconductor waveguide layer, opposite the first side, wherein the second dielectric layer is deposited along the second side of the semiconductor waveguide layer in place of the buried dielectric layer.

5. The method of claim 1, further comprising:
forming an interconnect structure over the first dielectric layer and the first cladding layer.

6. The method of claim 5, further comprising:
forming a process layer over the interconnect structure.

7. The method of claim 1,
wherein the first cladding layer and the second cladding layer comprise a first dielectric material, and wherein the first dielectric layer comprises a second dielectric material different than the first dielectric material.

8. The method of claim 1, wherein the semiconductor waveguide layer comprises silicon and the first cladding layer comprises silicon nitride.

9. A method for forming a semiconductor structure, the method comprising:
etching a semiconductor layer to form a semiconductor waveguide having a tapered segment, a device segment, and a tip, wherein the tapered segment is laterally between the device segment and the tip;
depositing a first cladding layer comprising a first dielectric material over the tapered segment, the device segment, and the tip of the semiconductor waveguide;
etching the first cladding layer to remove the first cladding layer from over the device segment and from over a first portion of the tapered segment, wherein the first cladding layer remains over the tip and a second portion of the tapered segment after the first cladding layer is etched;
depositing a first dielectric layer comprising a second dielectric material, different than the first dielectric material, over the first cladding layer, the first portion of the tapered segment, and the device segment after etching the first cladding layer;
depositing a second dielectric layer comprising a third dielectric material, different than the first dielectric material, under the first dielectric layer, the first cladding layer, the tip, the tapered segment, and the device segment;
etching the second dielectric layer to remove a first portion of the second dielectric layer from under the first cladding layer, the tip, and the second portion of the tapered segment to expose the tip and the second portion of the tapered segment, wherein a second portion of the second dielectric layer remains under the first cladding layer, the first dielectric layer, the device segment, and the first portion of the tapered segment after the etching of the second dielectric layer; and
depositing a second cladding layer comprising the first dielectric material under the tip and the second portion of the tapered segment in place of the first portion of the second dielectric layer.

10. The method of claim 9, wherein the semiconductor layer is over a buried dielectric layer, and wherein the buried dielectric layer is over a semiconductor substrate, the method further comprising:
removing the semiconductor substrate from under the buried dielectric layer;
removing the buried dielectric layer from under the semiconductor layer; and
depositing the second dielectric layer under the semiconductor layer.

11. The method of claim 9, further comprising:
depositing a first buffer layer over the tapered segment, the device segment, and the tip of the semiconductor waveguide before the first cladding layer is deposited over the tapered segment, the device segment, and the tip of the semiconductor waveguide, wherein the first cladding layer is deposited over the first buffer layer.

12. The method of claim 11, wherein the first buffer layer comprises a fourth dielectric material different than the first dielectric material.

13. The method of claim 11, wherein a thickness of the first buffer layer is substantially less than a thickness of the first cladding layer and a thickness of the semiconductor layer.

14. The method of claim 9,
wherein the second cladding layer is deposited directly on a bottom of the tip and a bottom of the second portion of the tapered segment.

15. A method for forming a semiconductor structure, the method comprising:
etching a semiconductor layer having a first refractive index to form a semiconductor waveguide having a tapered segment, a device segment, and a tip, wherein the tapered segment is laterally between the device segment and the tip, wherein the semiconductor waveguide is over a buried dielectric layer;
depositing a first cladding layer having a second refractive index over the tapered segment, the device segment, and the tip of the semiconductor waveguide;
etching the first cladding layer to remove the first cladding layer from over the device segment and from over a first portion of the tapered segment, wherein the first cladding layer remains over the tip and a second portion of the tapered segment after the first cladding layer is etched;
depositing a first dielectric layer having a third refractive index over the first cladding layer, the first portion of the tapered segment, and the device segment;
removing the buried dielectric layer from under the semiconductor layer;
depositing a second dielectric layer under the semiconductor layer in place of the buried dielectric layer, wherein the second dielectric layer has a fourth refractive index and is deposited under the first portion of the tapered segment, under the device segment, and beside the second cladding layer; and
forming a second cladding layer having the second refractive index under the tip and the second portion of the tapered segment,
wherein the second refractive index is less than the first refractive index, greater than the third refractive index, and greater than the fourth refractive index.

16. The method of claim 15, further comprising:
depositing a buffer layer having a fifth refractive index over the semiconductor waveguide before the first cladding layer is deposited, wherein the first cladding layer is deposited over the buffer layer, and wherein the fifth refractive index is less than the second refractive index.

17. The method of claim 15, wherein the second dielectric layer is deposited under the tip, the method further comprising:
   etching the second dielectric layer to remove the second dielectric layer from under the tip and the second portion of the tapered segment, wherein the second cladding layer is formed by depositing the second cladding layer beside the second dielectric layer, under the tip, and under the second portion of the tapered segment after the second dielectric layer is etched.

18. The method of claim 15, wherein the second dielectric layer is deposited under the first dielectric layer.

19. The method of claim 15, further comprising:
   removing a semiconductor substrate from under the buried dielectric layer before removing the buried dielectric layer from under the semiconductor layer.

20. The method of claim 15, wherein the fourth refractive index is approximately equal to the third refractive index.

* * * * *